(12) United States Patent
Sharma et al.

(10) Patent No.: US 8,539,570 B2  
(45) Date of Patent: Sep. 17, 2013

(54) METHOD FOR MANAGING A VIRTUAL MACHINE

(75) Inventors: Vipul Sharma, Germantown, MD (US); Andrew W. Brandt, Frederick, MD (US)

(73) Assignee: Red Hat, Inc., Raleigh, NC (US)

( * ) Notice: Subject to any disclaimer, the term of this patent is extended or adjusted under 35 U.S.C. 154(b) by 726 days.

(21) Appl. No.: 12/111,110

(22) Filed: Apr. 28, 2008

(65) Prior Publication Data

US 2008/0320583 A1 Dec. 25, 2008

Related U.S. Application Data

(63) Continuation-in-part of application No. 11/867,456, filed on Oct. 4, 2007, which is a continuation-in-part of application No. 11/767,173, filed on Jun. 22, 2007.

(51) Int. Cl.
 *G06F 9/00* (2006.01)
 *G06F 15/16* (2006.01)
 *G06F 17/00* (2006.01)

(52) U.S. Cl.
 USPC ............. 726/12; 726/6; 726/7; 726/22; 718/1

(58) Field of Classification Search
 USPC .................. 726/2, 6, 7, 12, 22, 24; 718/1
 See application file for complete search history.

(56) References Cited

U.S. PATENT DOCUMENTS

| | | |
|---|---|---|
| 7,181,769 B1 | 2/2007 | Keanini et al. |
| 7,356,679 B1 | 4/2008 | Le et al. |
| 7,409,719 B2 * | 8/2008 | Armstrong et al. ............. 726/24 |
| 7,600,259 B2 | 10/2009 | Qi |
| 7,698,545 B1 | 4/2010 | Campbell et al. |
| 7,761,917 B1 * | 7/2010 | Kumar ............................. 726/23 |
| 7,774,498 B1 | 8/2010 | Kraemer et al. |
| 7,877,781 B2 * | 1/2011 | Lim .................................. 726/1 |
| 7,886,294 B2 | 2/2011 | Dostert et al. |
| 7,949,404 B2 | 5/2011 | Hill |
| 7,987,359 B2 | 7/2011 | Kawano et al. |
| 7,996,836 B1 | 8/2011 | McCorkendale et al. |
| 8,065,714 B2 * | 11/2011 | Budko et al. ...................... 726/4 |
| 8,127,290 B2 | 2/2012 | Suit |

(Continued)

FOREIGN PATENT DOCUMENTS

| | | |
|---|---|---|
| WO | WO 2005-050414 | 6/2005 |
| WO | WO 2005-101782 | 10/2005 |

OTHER PUBLICATIONS

Red Hat Office Action or U.S. Appl. No. 11/867,456, mailed Jan. 19, 2012.

(Continued)

*Primary Examiner* — Jeffrey Pwu
*Assistant Examiner* — Jayesh Jhaveri
(74) *Attorney, Agent, or Firm* — Lowenstein Sandler LLP

(57) ABSTRACT

Methods for managing a virtual machine wherein an administration console (AC) (1104) transmits a query to a virtualization server (1116). The virtualization server 1116 includes at least one virtual machine (VM) (1124). AC (1104) receives, in response to the query, identification of a VM (1124) and establishes an authenticated communications link with a proxy machine (1108) adapted for communicating with the VM (1124). AC (1104) transmits over the authenticated communications link to proxy machine (1108) the identification of the VM (1124) and performs a management function with respect to the VM (1124).

19 Claims, 12 Drawing Sheets

(56) References Cited

U.S. PATENT DOCUMENTS

| | | | |
|---|---|---|---|
| 8,191,141 B2 | 5/2012 | Suit | |
| 8,336,108 B2 | 12/2012 | Suit | |
| 2003/0014626 A1 | 1/2003 | Poeluev et al. | |
| 2003/0046586 A1 | 3/2003 | Bheemarasetti et al. | |
| 2003/0084329 A1 | 5/2003 | Tarquini | |
| 2003/0101245 A1* | 5/2003 | Srinivasan et al. | 709/221 |
| 2003/0120935 A1 | 6/2003 | Teal et al. | |
| 2003/0145225 A1 | 7/2003 | Bruton et al. | |
| 2003/0158983 A1 | 8/2003 | Dalakuras et al. | |
| 2004/0122937 A1 | 6/2004 | Huang et al. | |
| 2005/0010765 A1 | 1/2005 | Swander et al. | |
| 2005/0102529 A1 | 5/2005 | Buddhikot et al. | |
| 2005/0125503 A1* | 6/2005 | Iyengar et al. | 709/213 |
| 2005/0125520 A1 | 6/2005 | Hanson et al. | |
| 2005/0240558 A1* | 10/2005 | Gil et al. | 707/1 |
| 2005/0289648 A1 | 12/2005 | Grobman et al. | |
| 2006/0037072 A1 | 2/2006 | Rao et al. | |
| 2006/0041885 A1 | 2/2006 | Broquere et al. | |
| 2006/0123133 A1 | 6/2006 | Hrastar | |
| 2006/0136720 A1* | 6/2006 | Armstrong et al. | 713/164 |
| 2006/0156380 A1 | 7/2006 | Gladstone et al. | |
| 2006/0230134 A1 | 10/2006 | Qian et al. | |
| 2006/0271395 A1* | 11/2006 | Harris et al. | 705/1 |
| 2007/0011667 A1* | 1/2007 | Subbiah et al. | 717/148 |
| 2007/0043860 A1* | 2/2007 | Pabari | 709/224 |
| 2007/0058551 A1 | 3/2007 | Brusotti et al. | |
| 2007/0147271 A1 | 6/2007 | Nandy et al. | |
| 2007/0169121 A1 | 7/2007 | Hunt et al. | |
| 2007/0198656 A1* | 8/2007 | Mazzaferri et al. | 709/218 |
| 2007/0204153 A1* | 8/2007 | Tome et al. | 713/164 |
| 2007/0204347 A1* | 8/2007 | Caceres et al. | 726/25 |
| 2007/0234412 A1* | 10/2007 | Smith et al. | 726/11 |
| 2007/0238524 A1 | 10/2007 | Harris et al. | |
| 2007/0261112 A1 | 11/2007 | Todd et al. | |
| 2008/0005124 A1 | 1/2008 | Jung et al. | |
| 2008/0016115 A1 | 1/2008 | Bahl et al. | |
| 2008/0016570 A1 | 1/2008 | Capalik et al. | |
| 2008/0047009 A1 | 2/2008 | Overcash et al. | |
| 2008/0056487 A1 | 3/2008 | Akyol et al. | |
| 2008/0089338 A1 | 4/2008 | Campbell et al. | |
| 2008/0140795 A1 | 6/2008 | He et al. | |
| 2008/0184225 A1 | 7/2008 | Fitzgerald et al. | |
| 2008/0263658 A1* | 10/2008 | Michael et al. | 726/22 |
| 2008/0271025 A1* | 10/2008 | Gross et al. | 718/102 |
| 2008/0288962 A1 | 11/2008 | Greifeneder et al. | |
| 2008/0320499 A1 | 12/2008 | Suit et al. | |
| 2008/0320561 A1 | 12/2008 | Suit et al. | |
| 2008/0320583 A1 | 12/2008 | Sharma et al. | |
| 2008/0320592 A1* | 12/2008 | Suit et al. | 726/23 |
| 2009/0049453 A1 | 2/2009 | Baran et al. | |
| 2009/0182928 A1 | 7/2009 | Becker et al. | |
| 2009/0183173 A1 | 7/2009 | Becker et al. | |
| 2009/0210427 A1* | 8/2009 | Eidler et al. | 707/10 |
| 2009/0216816 A1* | 8/2009 | Basler et al. | 707/204 |
| 2009/0254993 A1 | 10/2009 | Leone | |
| 2010/0011200 A1* | 1/2010 | Rosenan | 713/2 |
| 2010/0077078 A1 | 3/2010 | Suit et al. | |
| 2010/0332432 A1 | 12/2010 | Hirsch | |

OTHER PUBLICATIONS

Red Hat Office Action for U.S. Appl. No. 12/013,314, mailed Mar. 7, 2012.
Red Hat Office Action for U.S. Appl. No. 11/767,173, mailed Jul. 6, 2010.
Red Hat Office Action for U.S. Appl. No. 11/767,173, mailed Dec. 14, 2010.
Red Hat Notice of Allowance for U.S. Appl. No. 11/767,173, mailed Nov. 7, 2011.
Red Hat Office Action for U.S. Appl. No. 11/867,456, mailed Aug. 1, 2011.
Red Hat Office Action for U.S. Appl. No. 11/867,456, mailed Feb. 16, 2011.
Red Hat Office Action for U.S. Appl. No. 11/867,500, mailed Dec. 23, 2010.
Red Hat Notice of Allowance for for U.S. Appl. No. 11/867,500, mailed Jun. 29, 2011.
Red Hat Notice of Allowance for for U.S. Appl. No. 11/867,500, mailed Oct. 14, 2011.
Red Hat Office Action for U.S. Appl. No. 12/013,304, mailed Apr. 13, 2011.
Red Hat Office Action for U.S. Appl. No. 12/013,304, mailed Oct. 4, 2011.
Red Hat Office Action for U.S. Appl. No. 12/013,314, mailed Jul. 19, 2011.
Hardwood, Aaron, Parallel Virtual Machine, Oct. 22, 2003, pp. 1-5.
Red Hat Notice of Allowance for U.S. Appl. No. 12/626,872, mailed May 30, 2012.
Red Hat Notice of Allowance for U.S. Appl. No. 11/867,456, mailed Jul. 16, 2012.
Red Hat Office Action for U.S. Appl. No. 12/626,872, mailed Jan. 13, 2012.
Red Hat Office Action for U.S. Appl. No. 12/626,872, mailed May 30, 2012.

* cited by examiner

METHOD FOR MANAGING A VIRTUAL MACHINE

CROSS REFERENCES TO RELATED APPLICATIONS

This patent application is a continuation-in-part of and claims priority to U.S. patent application Ser. No. 11/867,456, filed on Oct. 4, 2007; patent application Ser. No. 11/867,456 is a continuation-in-part of and claims priority to U.S. patent application Ser. No. 11/767,173, filed on Jun. 22, 2007. Both of the aforementioned prior patent applications are hereby incorporated by reference into the present patent application in their entireties.

BACKGROUND

1. Field

The invention relates generally to virtualization techniques within a communications network, and more specifically to inspecting and manipulating an at-rest virtual machine (VM).

2. Background

Systems using virtualization technology where a communications network system includes one or more virtual machine have been previously described. For example, U.S. application Ser. No. 11/867,456, filed Oct. 4, 2007, and assigned to the assignee of the present invention, described methods for collaboration amongst nodes within a communications network, where some of the nodes were virtual machines. U.S. application Ser. No. 11/867,500, filed Oct. 4, 2007, and assigned to the assignee of the present invention, described methods for the insertion of a driver directly into a virtual machine executable file. U.S. application Ser. No. 12/013,314, filed Jan. 11, 2008, and assigned to the assignee of the present invention, described methods for communications between entities within a virtual communications network, some of which entities were virtual machines, and to tracking the activities of those virtual machines. U.S. application Ser. No. 12/013,304, filed Jan. 11, 2008, and assigned to the assignee of the present invention, described methods by which a virtual machine could determine information about and identify a host machine. All three of the aforementioned prior patent applications are hereby incorporated by reference into the present patent application in their entireties.

In a typical system utilizing virtualization technology, management of a virtual machine requires that the virtual machine actually be online. The ability to manipulate an at rest (offline) VM was limited. For example, in U.S. patent applications Ser. No. 11/867,500, filed Oct. 4, 2007 a method for direct insertion of a virtual machine driver was described, but the method was limited to altering the flat file of the VM and required that the driver to be inserted be compressible into the same size memory as a driver being replaced.

In many circumstances, the ability to manage a VM is critical to the proper functioning of the VM or the overall system. For example, one or more VM's within the system may need to have a new software package installed, or an existing software package within the VM may need to be patched or otherwise updated.

A need therefore exists for a more robust capability to manage virtual machines within a communications network. In particular, a method is needed that enables inspection and/or alteration of files associated with a VM, where the method is operable whether or not the VM is online. A further need exists to maintain knowledge of the current configuration of a VM within a network and to control that configuration at any time, whether or not the VM is online. This would facilitate performance of periodic inspections of multiple virtual machines associated with a network and enable a network administrator to prevent VM configuration drift (e.g., unauthorized modifications, whether deliberate or accidental, to a VM configuration). Furthermore, a need exists for methods to insert software into a file directory of an offline VM, for installation and operation upon the next startup of the VM, and to delete software from an offline VM. Finally, a need exists for methods to implement policy management on all VM's within a network, whether or not some VM's are offline.

SUMMARY

In accordance with one embodiment of the invention, a method for managing one or more virtual machines is provided, wherein, an administrative console establishes an authenticated communications link with a proxy machine adapted for communicating with a virtual machine (VM); transmits over the authenticated communications link to the proxy machine identification of the VM; and performs a management function with respect to the VM.

In an embodiment, the VM is offline.

In an embodiment, the proxy machine is a physical proxy machine, a virtual proxy machine executing on a physical machine separate from the virtualization server, and/or a virtual proxy machine executing on the virtualization server. In a further embodiment, the management function includes inspecting a file within the VM, where the file is a disk image file, a wrapper files a log file and/or a snapshot related file. In an embodiment, information obtained by inspecting the file is stored within a within the AC, the VM, and/or the proxy machine.

In an embodiment, the stored information has a quasi-unique identifier for associating the stored information with the VM. In a further embodiment the quasi-unique identifier is a hash of a record associated with the VM.

In an embodiment, the management function further comprises at least one of enforcing a policy and modifying the VM. In a further embodiment, modifying the VM includes installing administrative data, installing new software, updating an existing software component, and/or deleting a software component. In yet another embodiment, enforcing a policy comprises at least one of inserting, deleting and deprecating a certificate associated with the policy.

In an embodiment, the AC performs a management function by providing to the proxy machine identification information of a selected VM and the proxy machine mounts the selected VM and inspects a file within the selected VM.

In an embodiment, prior to establishing the authenticated communications link with the proxy machine, the AC transmits a query to a virtualization server including at least one virtual machine (VM). The AC receives, in response to the query, identification of a VM,

DETAILED DESCRIPTION

Numerous opportunities may exist within an enterprise for a host computing device (or simply "host device") to connect to an enterprise network. Often, such host devices may connect to the enterprise network in a way that results in a degradation of business continuity, the loss or destruction of intellectual property, or some other negative impact. These negative results could occur as a result of a malicious user purposefully trying to harm the network or as a result of an inadvertent user simply unaware of the damage being caused. Examples of such negative effects include infecting the enterprise network with viruses, Trojans or other malware; being used as a zombie in a distributed denial of service (DDoS) attack; or maliciously causing a DDoS on the infected host and also to other hosts on the network by flooding the network with unauthorized traffic.

One approach for handling the above situation would be to validate untrusted hosts in the enterprise before full enterprise communication and resource allocation is permitted between trusted peers. In this context, a trusted peer is a host device within an enterprise network and an untrusted host comprises a host device that has not been or, for some reason, cannot be fully authenticated. A trusted peer is a host device that has been adequately authenticated to the enterprise. Such authentication may be facilitated by a single trusted peer (in collaboration with the administration console) and also by collaboration between multiple trusted peers to determine peer authenticity and remediation of non-authentic enterprise nodes.

Once a distributed system of collaborating trusted (i.e., authenticated) peers has been established within an enterprise network, those trusted peers can operate in conjunction to determine a classification for another untrusted node. This collaboration requires only that the trusted nodes observe or witness the communication behavior of the untrusted node. Similarly, within a trusted node, collaboration can occur between trusted components at various levels within the computing stack to determine if any security vulnerabilities are being exploited.

Various embodiments of this mechanism and an exemplary process for installing it are described in the following subsections. As indicated, this mechanism could be remotely distributed from a single hardware platform to one or more nodes within an enterprise network. The mechanism could be installed in stages and each stage can be selected with the characteristics of that node in mind. The configuration at any given node could comprise an observation functionality, an analysis functionality, a reporting functionality, a remediation functionality or some subset of those functionalities.

Figure 1:
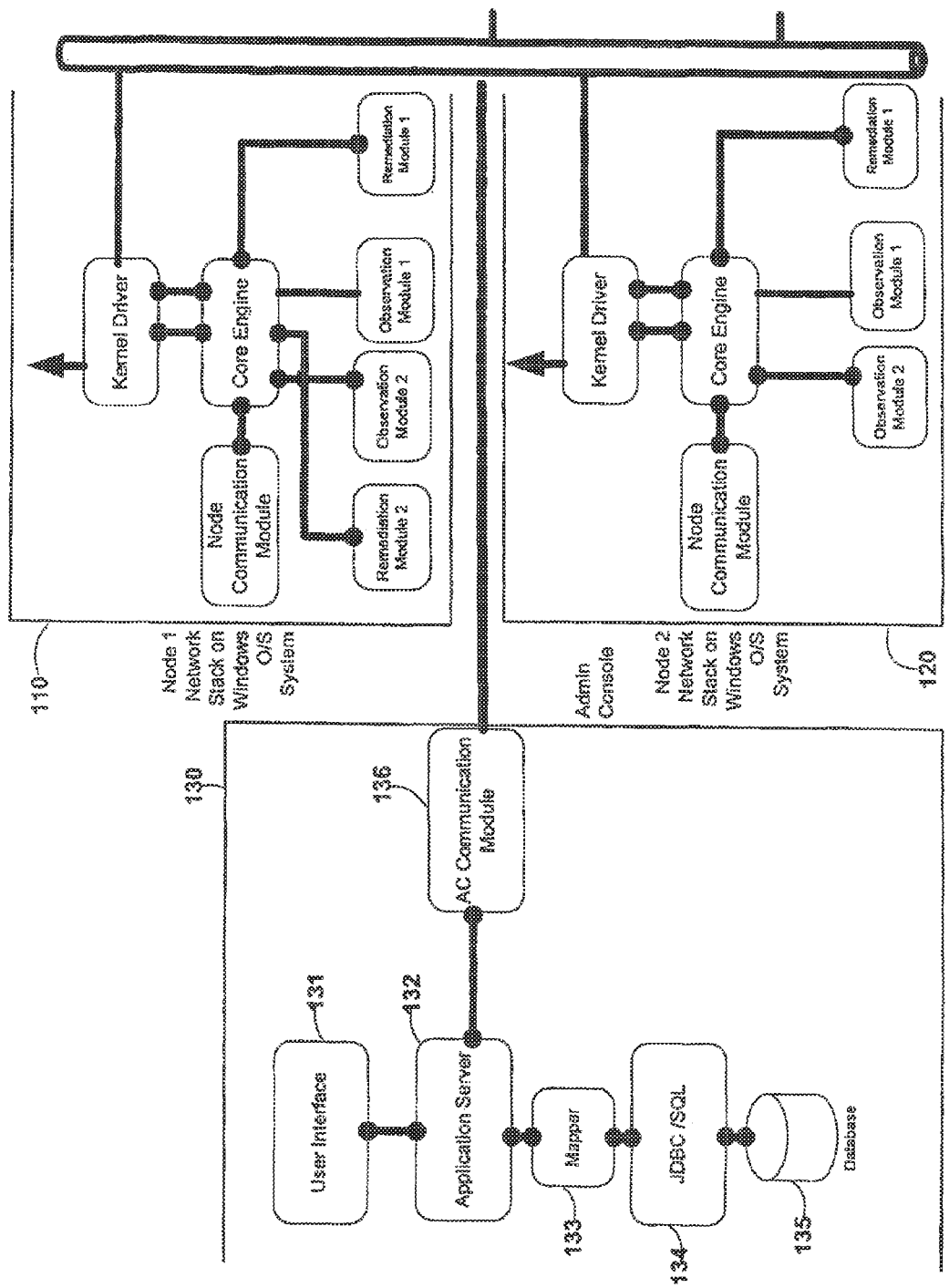
FIG. 1 illustrates an example of a high level component architecture usable in an embodiment of the invention.

FIG. 1 illustrates an example of a high level component architecture usable with an embodiment of the present invention. In this exemplary arrangement there are two network nodes 110 and 120 shown, although the number of network nodes is not intended to be limited to two. Additionally, while the network nodes are shown to be similar, they may be very different without affecting the use of the invention. The network nodes are coupled for data communication flow via a data transmission medium. The transmission medium could be wired, wireless, or some combination thereof and its type is not relevant to practicing the invention. In this embodiment, another computer platform 130 can be in communication with the network nodes via the data transmission medium. In this example, that platform is called an administration console (AC), which will also be a trusted peer to other trusted peers in the network.

In this example, the AC has at least the following components: user interface 131, application server 132, mapper 133, JDBC/SQL 134, database 135 and AC communication module 136. The AC propagates the security mechanism out to the various network nodes via the data transmission medium. It might propagate the mechanism in stages so as to first cause a receiving network node to install the core aspect or core engine of the mechanism when a user of the node logs in. The installation is designed to be transparent to the user and the core engine is hooked into the stack of the operating system of the node. This installation thus yields the disposition of the core engine and stealth kernel driver as shown in each of nodes 110 and 120.

Once the core engine component is installed, the AC may send a communication module component that enables data traffic pertaining to the collaboration mechanism functionality to be conveyed or communicated to and/or from that network node. These components are shown as the node communication modules in each of nodes 110 and 120. Collectively, the core engine, the node communication module, and the additional modules described below comprise a set of functional modules.

Once the node communication module is installed, the AC can forward one or more observation modules to the node. Examples of types of observation modules will be described below. Each such module can be designed to receive data packets intercepted between an adapter driver and a protocol layer of the node's operating system and then analyze the data packets to determine whether they are indicative of some activity or behavior of interest.

In one possible embodiment, the user interface of the AC will present a security dashboard to an operator. The dashboard will facilitate operator actions intended to remotely install, execute, report on and manage the state of the enterprise from a single geographic location.

In addition to illustrating components of interest, FIG. 1 illustrates example packet flows that indicate those packets directed to the security mechanism, packets that are target packets, that is packets of interest to the security mechanism, and flows where the packets are mixed, that is where there are target packets and security mechanism packets. In this example, the packet flows between the highlighted components with AC 130 are directed to the security mechanism, as is the traffic between the core engine and the node communication module within a node. The traffic between the core engine and the observation modules and remediation modules pertains to the target packets. The remainder of the illustrated data packet flows can be considered mixed.

Figure 2:
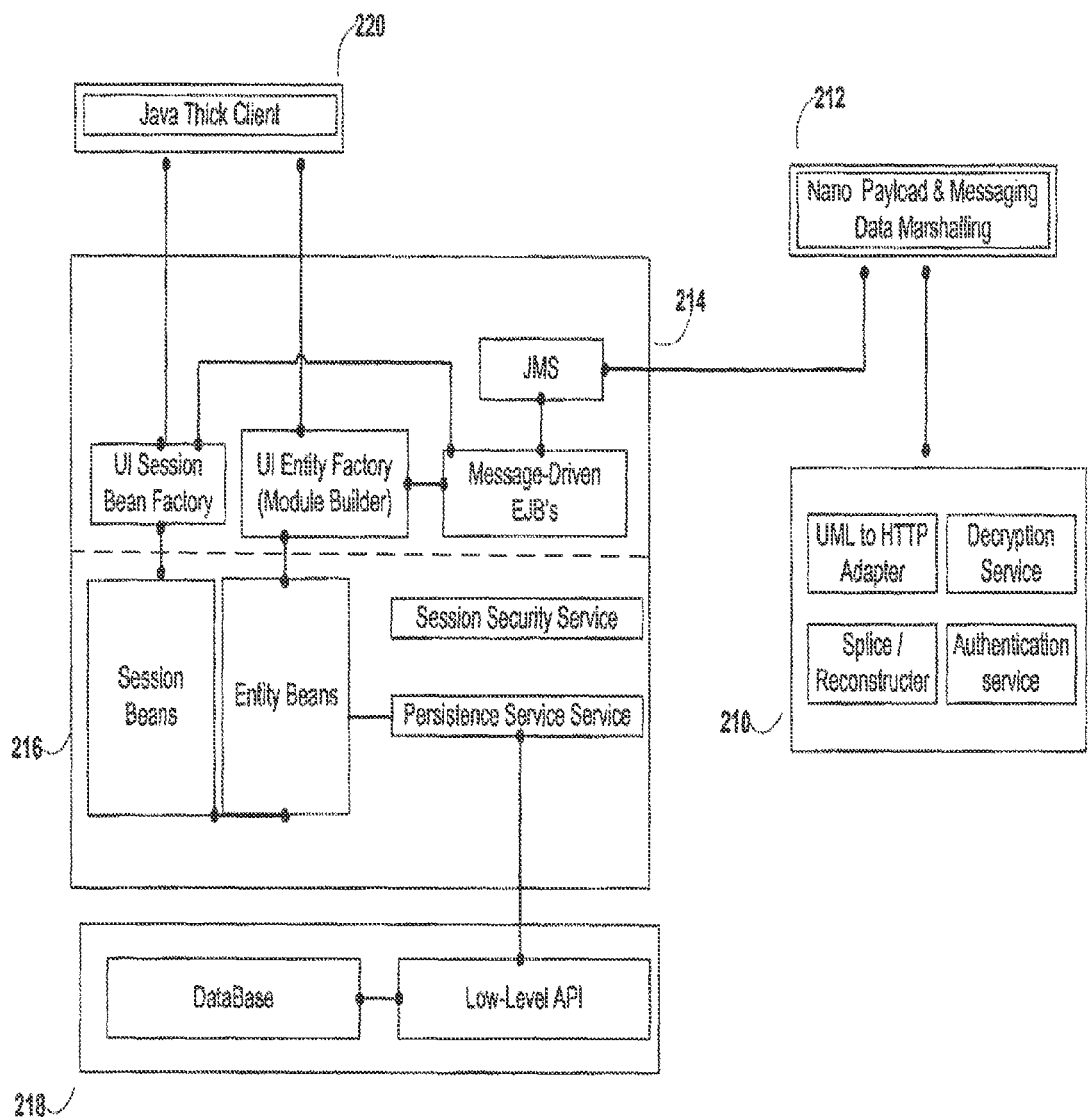
FIG. 2 illustrates an example of a high level component architecture of a central node usable in an embodiment of the invention.

FIG. 2 illustrates an example of a high level component architecture that could be used to implement an administrative console having the features and functionality of that described above in relation to FIG. 1.

In the example of FIG. 2, the AC can include six major components, a communication package 210, an object adapter 212, an EJB Servlet container 214, a J2EE Application Container 216, a data store 218, and thick client 220.

In one example configuration, data store 218 can include a relational database to store all persistent data pertaining to the security mechanism. This data can include, but is not limited to, system configuration information, system state information, activity reports from node modules such as from a communication module, an observation module or remediation module. The database could additionally store module activity event configuration, network topology data, node inventory data, operator credentials, and operator activity log data. Thus, the AC can monitor, track and act on information detected and/or collected by the security mechanism at the respective nodes. As a consequence, an operator or system monitor can prescribe further security-related activities to the network via the various network nodes. Also, because the AC can see the reports of multiple nodes, it can detect security attacks that might not be detectable by a single network node operating on its own.

Figure 3:
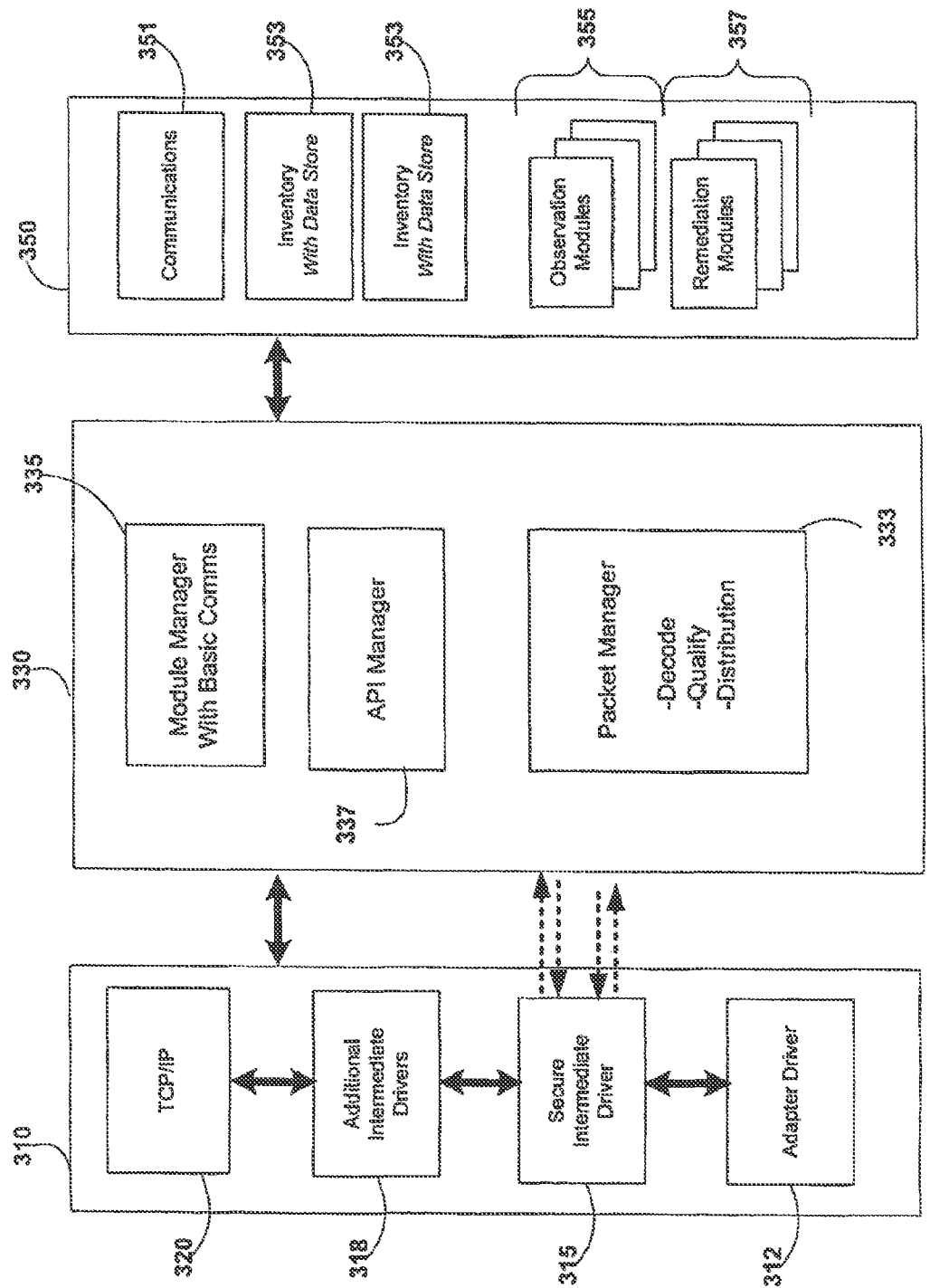
FIG. 3 illustrates an example of a high level component architecture of an installed detection arrangement usable in connection with the arrangement of FIG. 1.

FIG. 3 illustrates an example of a high level component architecture which could be used in the arrangement of FIG. 1. This exemplary illustration shows three major components of the network node, the network stack 310, a core engine 330, and a modules component 350. In accordance with this embodiment, a secure intermediate driver (SID) 315 is installed in the network stack, at the bottom of that stack, adjacent to adapter driver 312. As illustrated the network stack might also include additional intermediate drivers 318 between the SID 315 and the protocol layer, here TCP/IP 320. The SID 315 is one example of a packet driver that can intercept data packets from the network stack for processing by the remainder of the security mechanism. Specifically, once a packet is intercepted, it can be provided to the core engine (CE) which as shown in FIG. 3 can include a module manager 335, an API manager 337 and a packet manager 333. The CE will decode, qualify and route packets to any module which needs to process the packet. The CE can even be dynamically updated at run time.

The modules for observation and/or remediation are associated with the module component 350. In this example, the module component includes communications capabilities 351, inventory data stores 353, one or more observation modules 355 and one or more remediation modules 357. These observation and remediation modules are intended to handle the details of the packet processing operations. The modules also can be dynamically updated.

The above-described architecture is designed to include multiple strategies for packet drivers. An appropriate packet driver for a particular customer or node will depend on customer requirements. While the specifics may vary, it is beneficial if a packet driver has one or more of the following characteristics:

1. it intercepts packets as close to the adapter driver as possible;
2. it allows the packet driver to be re-installed if disabled by user control;
3. it detects whether the connection to the adapter driver is hooked/intercepted/tampered with in any way; and
4. persists in the core engine in non-volatile memory and load and execute the Core Engine.

Additionally, the Secure Intermediate Driver described above can be designed so that, for example in a Microsoft operating system environment, it will effectively look like an adapter driver to the protocols and a protocol to the adaptive driver. The SID can then forward all of the packets to the CE and it can effectively forward all packets between the protocols and the adapter driver transparently if desired.

Figure 4:
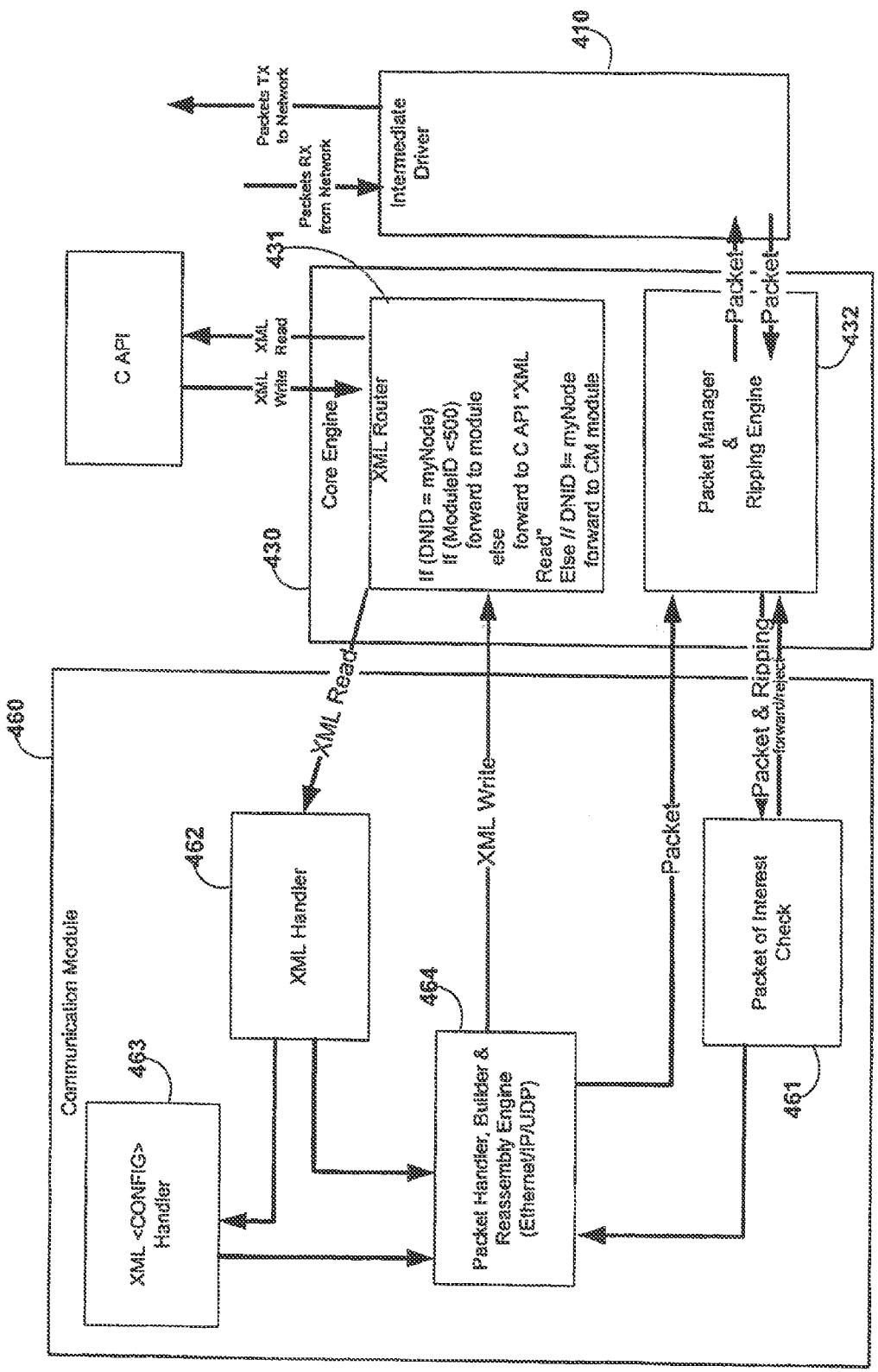
FIG. 4 illustrates another high level view of an installed detection arrangement along with exemplary packet flows.

FIG. 4 provides another component level diagram of an aspect of the security mechanism that can be installed in a node such as in FIG. 1. In this illustration additional features of the Core Engine are illustrated and aspects of a communication module, such as element 460 in FIG. 1 are shown in detail.

In FIG. 4 an intermediate driver 410 receives packets from the network and transmits packets to the network. This could be the SID described above. The intermediate driver intercepts packets from this flow and provides them to the CE 430. In this illustration two aspects of the CE are referred to, XML router 431 and Packet Manager and Ripping Engine 432. The intermediate driver exchanges packets with Packet Manager and Ripping Engine 432. As will be described in connection with FIG. 5, the Core Engine will forward packets to/from the drivers to any module that is registered to receive that traffic. In this illustration, however, the focus is on communications, particularly between this instantiation of the security mechanism and another instantiation of the mechanism at another node or with the Administrative Console.

In the arrangement of FIG. 4, the XML Router interacts with C-API, a device that has a read/write interface that enables the AC to communicate with elements of the security mechanism. Furthermore, the XML Router and the Packet Manager and Ripping Engine interface with communication module 460. The Packet Manager and Ripping Engine sends an intercepted packet to the Packet of Interest Check 461. If the packet is of interest it is queried for processing by the Packet Handler, Builder and Reassembly Engine 464 which is responsive to XML Handler 462 and XML Handler 463. The result is that the communications module will take any XML message destined for another security mechanism and package that message into an Ethernet message. The Ethernet message is sent back to the Packet Manager in the CE and is forwarded to the Intermediate Driver for transmission on the network.

Figure 5:
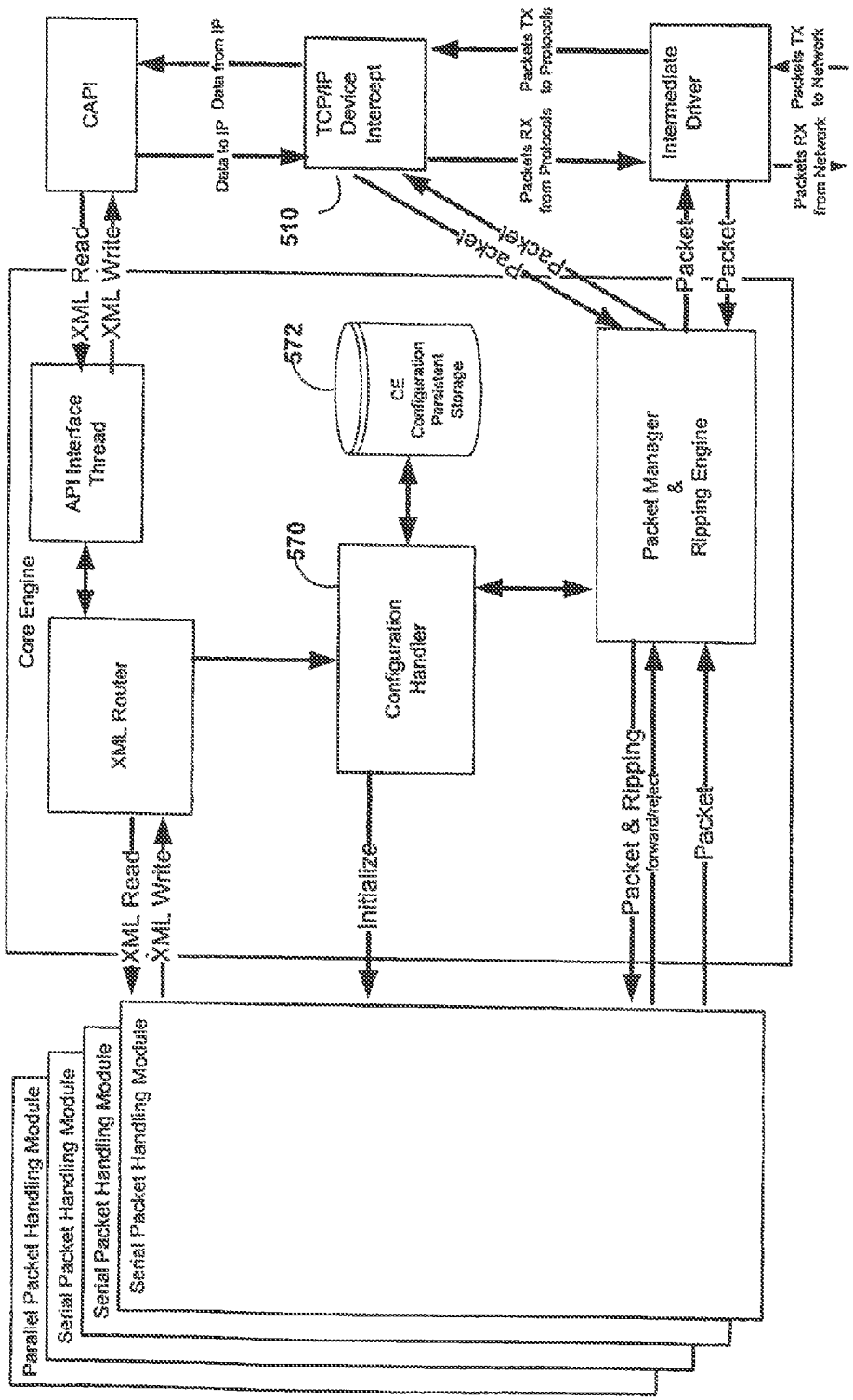
FIG. 5 illustrates an example of a component level arrangement usable in a configuration such as FIG. 4.

FIG. 5 provides another component level view of aspects of the Core Engine. In this illustration, the Core Engine is shown interfacing with the C API and the intermediate driver as in FIG. 4. However, this illustration shows the CE interacting with one or more modules and with a TCP/IP Device Intercept. Also, this arrangement shows more aspects of the CE.

In this arrangement, the CE's Packet Manager and Ripping Engine exchanges packets with the intermediate driver, as above, and with the TCP/IP device intercept 510. The Packet Manager and Ripping Engine further exchanges packets with various handling modules as appropriate.

Within the CE, the API interface thread handles the read/write interface from the CAPI as described above with respect to FIG. 4. The XML Router performs the same functions as in FIG. 4 but is now shown to interface more specifically with a configuration handler 570 that has associated CE Configuration persistent storage 572. The Configuration Handler is a thread that will process all CE <CONFIG> messages and will persist the current configuration so it can be retrieved on any re-start. This might even include information about any of the modules that have been installed in the system.

Figure 6:
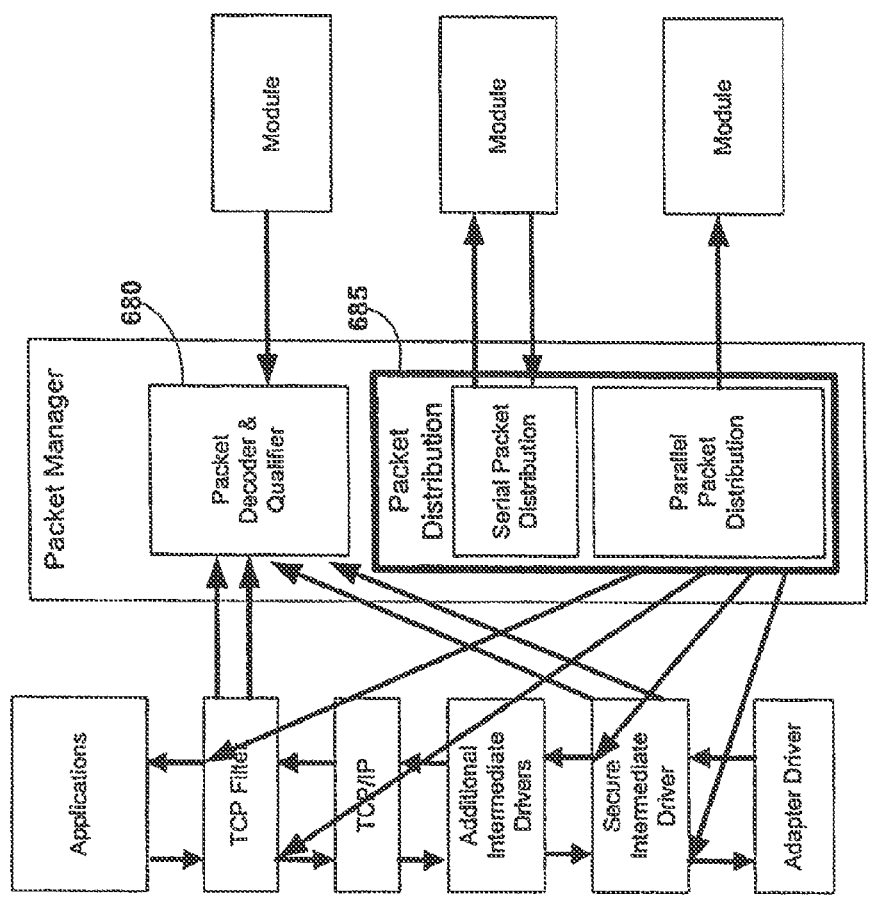
FIG. 6 illustrates an overview of an example of a packet manager usable in a configuration such as that illustrated in FIG. 4.

FIG. 6 provides an illustration of an example of an arrangement of a packet manager (PDM) that could be used in the configurations above, along with items with which the Packet Manager can interact. In the overview shown in FIG. 6, the Packet Manager can include a Packet Decoder and Qualifier 680 as well as a Packet Distribution element 685 that can adapt to either serial distribution of packets (sending the packet to a first module and when processing is complete sending it to a second module) or a parallel distribution of packets (sending a packet to multiple modules in parallel).

As illustrated in FIG. 6, the Packet Decoder can receive packets from the secure intermediate driver and/or a TCP filter. The TCP filter could be a TCP/UDP/Raw filter used to intercept packets/data to and from the TCP/IP device, the UDP device and the Raw device. This will allow a module to receive traffic before it reaches the TCP/IP stack from an application. As in prior descriptions, the Secure Intermediate Driver will be used to intercept packets from any protocol device or any additional intermediate drivers that are installed in the stack, and from the Adaptive Driver.

The PDM will get packets from each connection to the TCP/IP device. In the case where there are multiple TCP/IP addresses the PDM could identify each connection with a unique identifier. This connection identifier will have correlating information stored in an Inventory Module which is described below. The PDM will also get packets from each adapter driver that is currently installed in the system. The PDM will also identify each packet stream to/from the adapter driver with a unique identifier.

The PDM allows modules to request packets/data from each potential source. The PDM has two specific request types; the first is a serial "forward" of the packets and the second is to forward the packet information in parallel with a "smart pointer". Modules that request a serial "forward" of the packets/data will have the potential of modifying the data before the data is forwarded onto the next module or the egress of the PDM. The PDM will allow the modules to specifically ask for traffic from a specific point in the network stack (i.e., egress down from a specific TCP/IP device connection, or ingress up from the adapter driver), or from a specific direction to/from all connections in the network stack (i.e., ingress up from all adapter drivers).

The PDM will perform packet decodes (as much as possible) on all packets/data received by the PDM. The PDM will allow modules to ask for packets/data based on decoded packet/data information.

The following is a list of features that the PDM could be configured to handle:
1. The PDM will obtain traffic flows to/from the Adapter Driver with a connection that is as close to the Adapter Driver as possible.
2. The PDM will obtain traffic flows to/from the TCP/UDP/Raw filter with a connection that is as close to the Applications as possible.
3. The PDM will allow modules to register for serial packet/data forwards based on a specific location and unique device, based on a specific location for all devices, or based on a decoded packet filter.
4. The PDM will allow the modules to modify the serial packet/data traffic and will forward the modified data.
5. The PDM will allow modules to register for parallel packet/data traffic. The PDM will distribute this information using "smart pointers". Modules are not allowed to modify packet/data traffic received with a parallel packet registration.
6. The PDM will allow modules to register for parallel packet decodes information to be sent to the module. The PDM will distribute the packet decodes information using smart pointers.
7. The PDM will allow modules to specify the priority of the filter for serial packet forwarding, parallel packet forwarding, and parallel packet decode forwarding for packets/data received at any specific location. The priority of the filter will determine what order packets will be forwarded to a module. A module may specify a different priority for packets received at different points. For example a module may specify a high priority for packets received on the ingress from the adapter drivers so that it sees packets before any other modules for traffic on the way in, and specify a low priority for packets received on the ingress from the protocol drivers so that it sees packets last after any other modules for traffic on the way out.
8. The PDM will allow modules to "kill" packets/data so that the data is no longer forwarded. This will allow a remediation module to block all packets to/from devices as required.
9. The PDM will, allow modules to generate new packets/data to/from any connection point.

As illustrated in many of the drawing figures and as discussed above, the security mechanism can be deployed within a node with one or more modules such as observation modules and remediation modules, Modules could have a variety of functionality. Some modules could gather computer inventory, some modules could gather network topology, some modules could perform behavior analysis on the network traffic, and some modules could remediate network traffic. All modules in the system must be designed against a set of generic requirements for modules. The generic requirements are as follows:
1. Modules will be installed by the Core Engine and be coded to operate in kernel space or user space.
2. Modules should be able to be uninstalled on demand at run-time.
   a. When a module is asked to uninstall it should clean up all resources, and then inform the CE that it is ready to be uninstalled.
3. Modules should have the ability to persist information.
   a. Modules can temporarily ask the CE to persist some memory. This should be used when a module is being upgraded but information needs to be passed between the old and new module. In this case the CE will be passed a block of information that will be kept in memory.
   b. The modules will use a set of library functions to persist information to the hard drive or other persistent memory in the system. These library functions will encrypt the data, and obfuscate the data to avoid disseminating information to the modules.

As indicated above, the communications module will be used by all other modules to communicate with the Administration Console. The communications module may have multiple modes of communication that it can use, including:
1. Ethernet Broadcast packets—These broadcast packets will not use IP, and therefore will not be routable. However, other nodes which see these messages may route them to/from the AC.
2. UDP packets—This will be a standard UDP packet stream to the AC.
3. Spliced UDP packets—This will be standard UDP packet streams sent in different splices routed via other nodes to the AC.

4. Covert communications—this will use normal IP traffic streams and embed covert communications in to the stream so that communications can not be easily traced.

5. Covert spliced communications—this will use normal IP traffic streams, and may splice the traffic via different channels to reach the AC. The spliced traffic may be routed via other nodes to the AC.

The following features may be desirable for the CM:

1. Receive, authenticate, validate, and decrypt all messages from the AC. Encrypt, create a message integrity check, sign, and send all messages to the AC.

2. Receive all module creation messages, and when a module is complete authenticate, validate, and decrypt the module. Send the module to the module manager for installation.

3. Route all messages received to the proper module or modules.

4. Handle multiple priority messages from various modules and send those messages in the order required based on priority. The CM should be able to stop sending a lower priority message that has been partially sent in order to send a higher priority message. The CM should resume sending the lower priority message when possible, with out retransmitting the entire message.

Other potential modules that might be used include an Inventory Module (IM), a Discovery Module (DM), Remediation Modules (RM) and Observation Modules (OM).

The IM could be used by all other modules to get inventory information about the computer. The IM could track information like the following:

1. What network cards are installed in the system, and will generate a unique identifier for traffic to/from the network card. The IM will attempt to determine the type of network card; including, wireless, Ethernet, GigE card, and etc. and will determine if Microsoft VPN services are configured on the system.

2. What protocols are installed in the system, and will generate a unique identifier for the traffic to/from the protocol.

3. The software packages that are installed on the system.

4. Will attempt to determine if VPN software is installed on the system. Will specifically look for an intermediate driver from DNE and PCAUSA.

5. Will attempt to determine if a packet sniffer is installed on the system; i.e., Sniffer Pro, Etherpeek, and Ethereal. Will determine if winpcap is installed on the system.

The DM could be used by all other modules to get discovered network information. The DM could maintain information like the following:

1. The MAC addresses of any computer that has been seen on the network.

2. The IP or other network address for any MAC address seen on the network.

3. Duplicate IP addresses will be managed.

4. Multiple IP addresses from a MAC address will be managed.

5. The NNE status of computers seen on the network.

6. The packet counts and octet counts for data sent between computers seen on this network.

RM's could perform remediation against network traffic flows. These may be flows detected by Observation Modules (OMs) that are originating from malware, flows blocked by AC configuration, or other network traffic flows identified by any Observation Module (OM). Remediation may be blocking the traffic flow, resetting the traffic flow, or spoofing that the traffic flow is proceeding while blocking the flow (i.e., like a honey pot).

Initially the RM's will be "dormant" and not have any packet filters registered. They will register their APIs to the API Manager in the CE. If an RM receives a configuration message from the AC or an OM to filter a specific network traffic stream, then it will use the API manager to get the Packet Manager API, and register a serial packet filter for the traffic stream. When that packet stream is delivered to the RM, then it can perform remediation.

Typically, the RM will be required to perform the following:

1. Receive remediation requests from the AC or OMs.

2. Use the IM to determine the appropriate packet filters to use to remediate the request.

3. Register with the Packet Manager for the appropriate serial packet filters.

4. Remediate the traffic received from the Packet Manager.

OMs could perform behavior analysis on the various network packet flows received by the security mechanism. There will be different type of OMs that will look for different network behaviors. The OMs will use the other modules in the system to perform the behavior analysis.

The OMs will be required to perform the following:

1. Use the IM to determine the appropriate packet filters to use for the OM to operate properly.

2. Register with the Packet Manager for the appropriate serial or parallel packet filters.

3. If required, use the DM to get network topology information.

4. When required issue alarm information via the CM to the AC.

5. When requested issue status information via the CM to the AC.

6. If required, receive configuration information and persist that configuration information.

7. When required issue requests to the RM to provide remediation.

Figure 7:
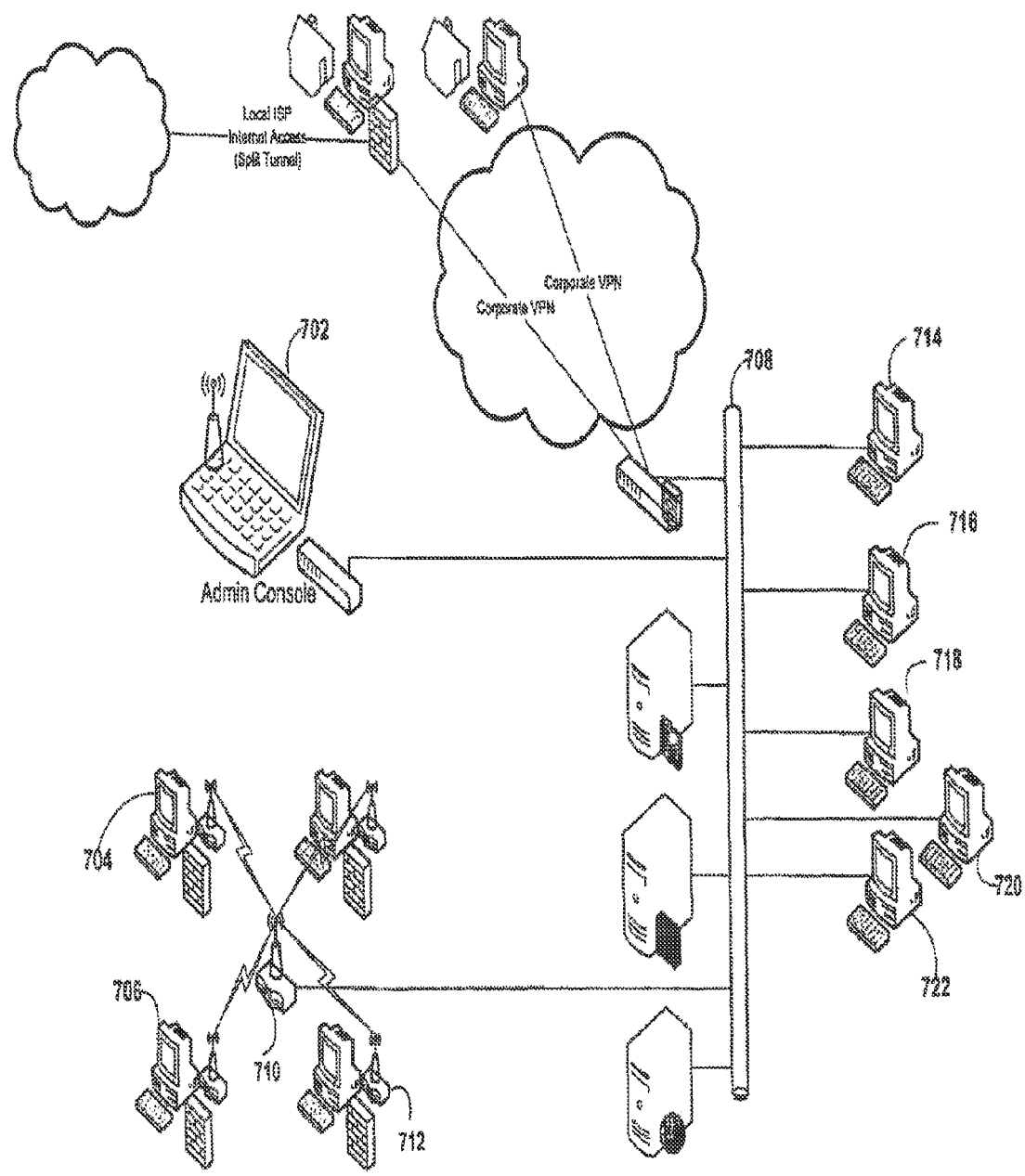
FIG. 7 illustrates an example of a collaboration mechanism allowing collaboration between network nodes.

FIG. 7 is a network diagram of an aspect of the collaboration mechanism that can be installed on one or more nodes in the system. This diagram depicts an administrative console 702, several authenticated and trusted peers and four unauthenticated (and therefore untrusted) hosts. In an embodiment, each trusted peer contains a core engine and one or more modules, as described above. In particular, each trusted peer can contain a collaboration module. The use of a collaboration module allows for one or more trusted peers to be configured with a collaboration mechanism that defines the capability and access permissions of that peer within the confines of the virtual and physical domains in which that trusted peer resides. For example, a trusted peer may be provided the ability to access specific data stores that would be unavailable to untrusted hosts. Collaboration by trusted peers can further lead to the prevention of unauthorized (a) tampering, (b) enterprise network resource usage, (c) disruption in business continuity, and (d) spoofing of trusted peers.

Determining whether an untrusted host can be acceptable to trusted peers and have access to enterprise resources can occur by allowing multiple trusted peers to collaborate with each other to identify and classify the state of the unknown or untrusted host being observed. Referring to the exemplary system shown in FIG. 7, a trusted peer 704 and another trusted peer 706 can be connected to local area network 708 via wireless access point 710. In an embodiment, each trusted peer 704 and 706 in the wireless network can contain the collaboration module described above. If an untrusted host 712 connects to access point 710, trusted peers 704 and 706 can collaborate with each other, the administrative console 702 and, possibly, other trusted nodes connected to local area network 708 in observing the behavior of untrusted host 712. Based on the observation, identification, and classification of the activities of untrusted host 712 by the trusted nodes, untrusted host 712 could become trusted.

In a similar fashion, untrusted host 714 can be physically connected to local area network 708. Trusted peers 716, 718, 720, and 722, each containing a collaboration module as described above, can collaborate on the observation, identification, and classification of the activities of untrusted host 714. This can be accomplished by trusted nodes sharing information they observe from the unknown host's communications with enterprise networks resources as well as the trusted peers themselves. Eventually, that collaboration could lead to untrusted host 714 becoming trusted. Alternatively, untrusted host 714 could exhibit questionable behavior or could violate policy. In such a case, the rest of the trusted nodes on network 708 could contribute to preventing access by untrusted host 714 to network resources.

Any number of behaviors by or characteristics of an untrusted node could be observed by the trusted hosts. Enterprise network communications between both trusted peers and untrusted hosts could be observed or monitored for behavior that could be used to determine the risk associated with continuing a networked relationship with any given trusted peer or untrusted host, regardless of it's classification. Such a list of behaviors could be provided to the trusted peers by a user, developed through a self-learning process, or some combination of the two.

As an example, trusted peers 716, 718, 720, and 722 in FIG. 7 could observe and monitor untrusted host 714 for attempting such things as DNS cache poisoning, IP mapping modifications, phishing, and resource access polling, and then communicate such information amongst all trusted peers (including the administration module). DNS cache poisoning refers to an attack that causes a Domain Name Server (DNS) to appear to have received accurate DNS information. The attack exploits a flaw in the DNS software that can make it accept incorrect information that can then leads to legitimate DNS requests being directed to IP addresses of rogue servers that could potentially contain malicious content. IP mapping modifications involve an attacker attempting to divert traffic by modifying the IP address of a machine (which can be handled within the system described herein via DNS name to IP mapping verification). Phishing refers to an email-based attack, which attempts to gain personal information by convincing the recipient to share personal information with the sender who is usually masquerading as a different entity (e.g., a bank or other financial institution). Resource access polling describes the activity of an attacker trying to access information without authorized access (e.g., searching for social security numbers in databases on the system).

Since each of the above attacks is network based, the trusted peers could collaborate in their observation and remediation of the untrusted host. In a virtual environment, if the untrusted node existed on a physical machine that was a trusted peer, the attacks could be observed there as well by the collaboration between the driver in the hypervisor and the device driver in the operating system (as discussed further in the context of FIG. 8).

Also as a result of the above described distributed approach if one or more trusted peers require a module that is temporarily unavailable from Administration Console 702, a trusted peer may request or be pushed a module or set of modules and updated configuration from the other trusted peers. For example, in the event that trusted peer 720 did not have one or more particular remediation modules as described above in the context of FIG. 1, those modules could be requested from trusted peers 716, 718, and 722. Alternatively, if trusted peers 716, 718, and 722 detected that trusted peer 720 did not have those remediation modules (without being requested by trusted host 720), trusted peers 716, 718, and 722 could push those remediation modules to trusted host 720.

With the observation and determination of "authenticated" peers that exhibit one or many of these behaviors, a system according to the present invention can allow for the denial of access to network resources by the untrusted host. To do this, one or more trusted peers can ignore the communication attempts by an untrusted host. This methodology can also prevent an untrusted host from introducing unauthorized traffic into an intranet or over the Internet. Further, behavior by neighboring hosts and other network elements (like routers, switches, firewalls, etc) can be enforced per policies supplied, for example, by the network administrator.

Figure 8:
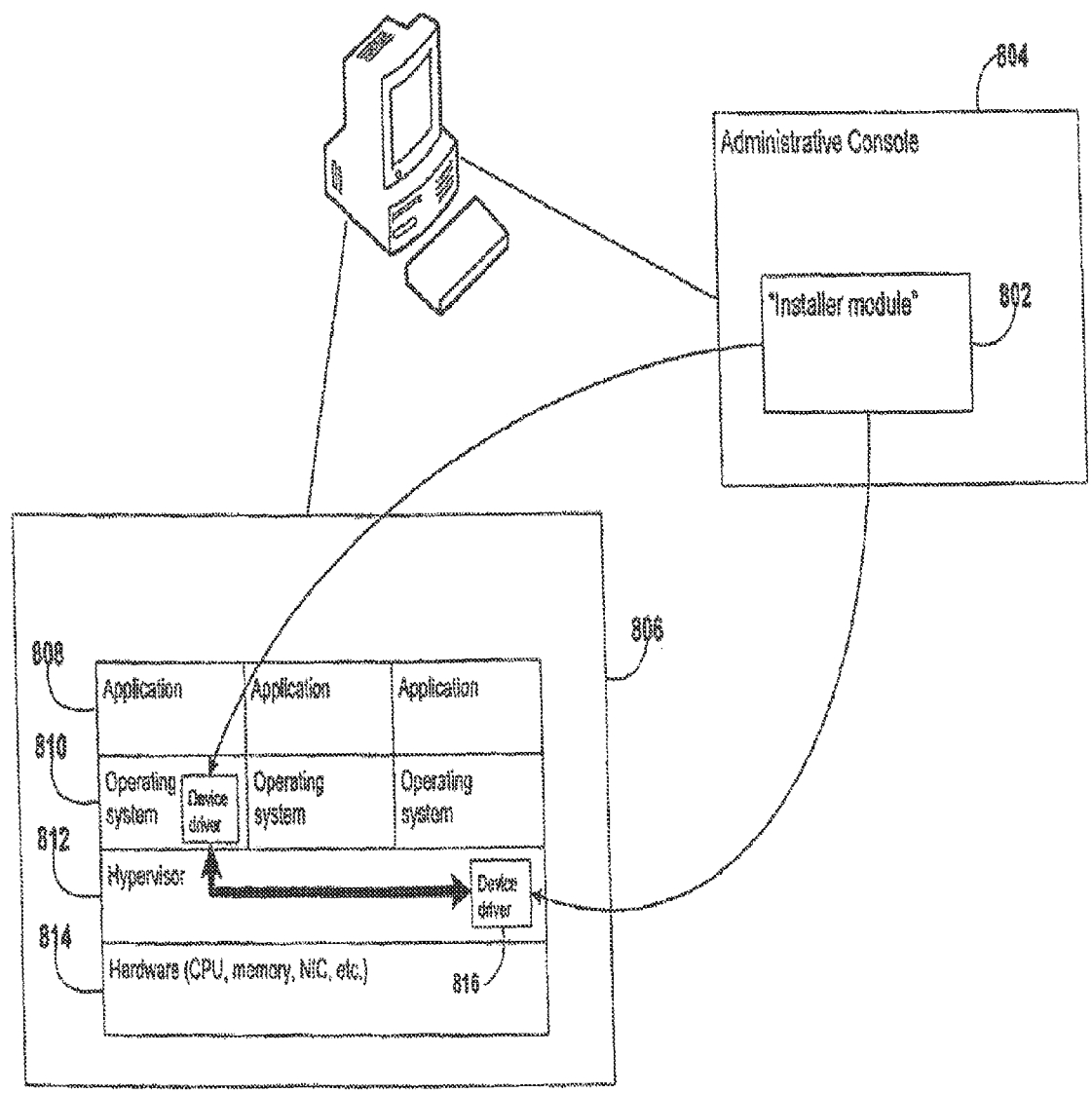
FIG. 8 illustrates an example of an arrangement usable in a configuration such as that illustrated in FIG. 7.

Similarly, access by an untrusted host can be remediated in a virtualized environment. In such a case, access by the untrusted host to the network could be restricted or completely prevented by a driver running on the associated hypervisor (as illustrated in the context of FIG. 8). This could occur, for example, where an untrusted host is determined to be, and thus classified as, a "rogue." In such an instance, that rogue host's network communications can be filtered by all trusted peers. The rogue host could effectively be removed from the enterprise, including, for example, by terminating the process on the physical machine on which it resides or (in a virtualized environment) by having the other trusted peers ignore the untrusted host's virtual machine. This could result from a configuration change dynamically sent to the trusted peers by administration console 702.

Using collaboration in the virtualized environment (as illustrated further in the context of FIG. 8), it is possible to determine if a kernel driver or other malicious code has been maliciously inserted. This could occur, for example, where malicious code is inserted inline, between the operating system driver and the physical kernel driver (i.e., in the hypervisor). Such a case could be observed and analyzed by the two drivers collaborating with each other in analyzing the differences between what was requested or inserted into the stack, and what was yielded or realized at the driver placed directly above the adapter driver of the physical machine.

For cases where trusted peers determine and classify a formally untrusted host's state as safe (or trusted), a message can be sent to administration console 702 to insert the core engine described above to the newly classified peer, along with other modules appropriate for that trusted peer. Having been authenticated, the now trusted peer will also be instantiated with a collaboration module to assist in future analysis of untrusted hosts that connect to the network. The insertion of the collaboration module in the now trusted peer could, further, be accomplished without needing to restart the trusted peer.

FIG. 8 depicts an installer module 802 within an administrative console 804 that can be used for installing a collaboration module (in the form of a device driver) in a virtual machine 806. Virtual machine 806 contains applications 808, operating systems 810, hypervisor 812 and hardware 814. Administrative console 804 can receive information from other trusted peers and cause installer module 802 to install a device driver 816 in the operating system kernel 810 of a virtual machine and a driver 818 onto the hypervisor of the physical machine.

Once installed, device driver 816 in the operating system kernel and hypervisor driver 818 can collaborate with each other and with other trusted peers to observe activity by other untrusted hosts. For example, device driver 816 and driver 818 could determine if an untrusted host has installed a rootkit by collaborating and comparing activity that was intended by the application and what services were actually requested to the hypervisor 812 of the physical machine.

Figure 9:
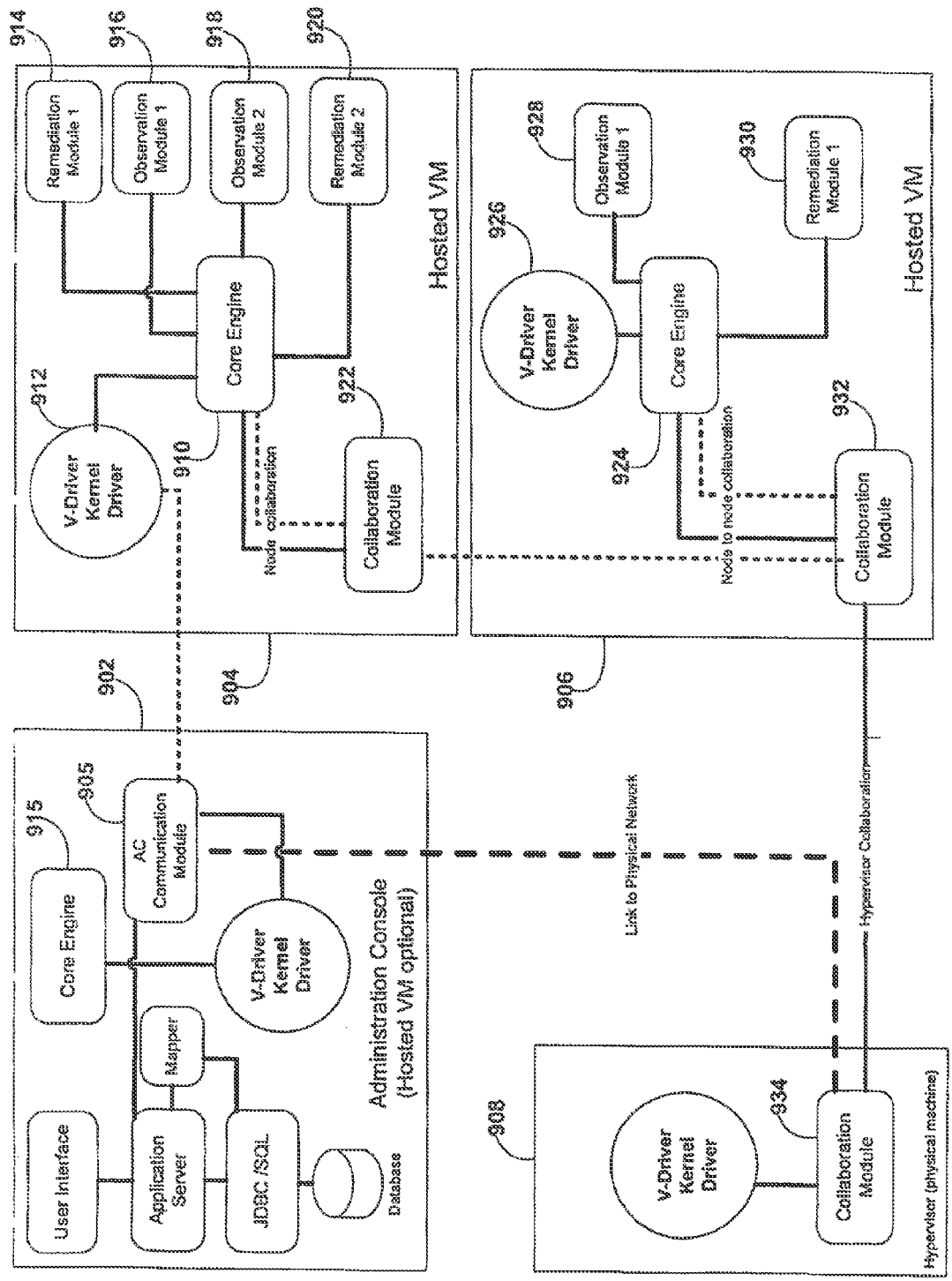
FIG. 9 illustrates an example of an arrangement of modules that can be used for collaboration amongst trusted peers in a network.

FIG. 9 provides a component level network diagram of another aspect of the collaboration mechanism that can be installed in a trusted peer. In this illustration, hosted virtual machine 904 and 906 can each be installed on a trusted peer within the network. Administration console 902 can collaborate over the network (not shown) with hosted virtual machine 904, hosted virtual machine 906, and hypervisor 908. Administration console 902 contains AC communications module 905 that can be used for exchanging information with the various elements in the network, including V-Driver Kernel Driver 912 within hosted virtual machine 904 and collaboration module 934 within hypervisor 908.

Similarly, hosted virtual machine 904 can collaborate with hosted virtual machine 906. In an embodiment, collaboration module 922 within hosted virtual machine 904 can communicate over the network with collaboration module 932 within hosted virtual machine 906. As described above with respect to FIG. 7, the two hosted virtual machines 904 and 906 can collaborate on the observation, identification, and classification of the activities of other trusted peers and untrusted hosts in the network. This can be accomplished by trusted nodes sharing information they observe from the unknown host's communications with enterprise networks resources as well as the "authenticated nodes themselves.

Within hosted virtual machine 904, collaboration module 922 can also perform observation and analysis on activities that lie only within hosted virtual machine 904. For example, collaboration module 922 can observe the integrity and authenticity of the code that makes up all of hosted virtual machine 904 by utilizing an electronic signature. In an embodiment, collaboration module 922 can generate a cryptographic digital signature across various portions of the executable code that make up hosted virtual machine 904. The digital signatures could then be checked at various times during the operation of hosted virtual machine 904 to verify that no changes had been made to any of the code (e.g., by a malicious or rogue entity within the network).

In an embodiment, a digital signature refers to a public key digital signature (or simply digital signature), which can be calculated across any data object using well understood cryptographic techniques. A digital signature derives its security from the concept of a key pair, consisting of a public key and private key that have a specific mathematical relationship between them. Within a public key infrastructure (PKI), a key pair can be provided to each entity or machine that is to generate digital signatures. In a PKI, the public key can be shared publicly without jeopardizing the overall security of the system.

More specifically, the mathematical relationship between the public key and the private key that comprise the key pair permits the public key to be revealed while maintaining the security of the overall system. This characteristic is particularly important in an open network system such as the Internet where entities need a reliable means of authentication. The private key, on the other hand, must be securely maintained in order for the security of the system to be maintained.

A public key pair used to produce a public key digital signature further has the property of computational infeasibility; i.e., it would be computationally infeasible for an entity to determine the private key of a user from the public key of that user. Thus, the user may share the public key of the user's key pair through a mechanism known as a digital certificate (or simply a "certificate"). In addition to the public key, a certificate may contain a number of other fields that contain information about the holder of the certificate. The well understood X.509 standard, ITU recommendation ITU-T X.509, defines a certificate format commonly used for Internet communications.

In the system shown in FIG. 9, collaboration module 922 would securely maintain the private key (e.g., encrypted in nonvolatile memory). When needed, collaboration module 922 could use a private key to calculate a digital signature on the code that comprises V-Driver Kernel Driver 912, core engine 910, remediation module A 914, observation module A 916, observation module B 918, remediation module B 920, and collaboration module 922. The resulting digital signature and the public key that corresponds to the private key could then be used by collaboration module 922 to check the integrity of the code that makes up hosted virtual machine 904.

FIG. 9 also depicts hosted virtual machines 904 and 906 having different modules installed. In the trusted peer that contains hosted virtual machine 904, core engine 910 can exchange information with remediation module A 914, observation module A 916, observation module B 918, and remediation module B 920 (as described above with respect to FIG. 1). In contrast, the trusted peer that contains hosted virtual machine 906 only contains observation module A 928 and remediation module A 930. In an embodiment involving the collaborative capabilities described above, collaboration module 932 can indicate its need for an observation module B and a remediation module B since it does not have those installed. In the event that those modules were unavailable from administration console 902, collaboration module 932 could collaborate with collaboration module 922 to receive and install an observation module B and a remediation module B.

Figure 10:
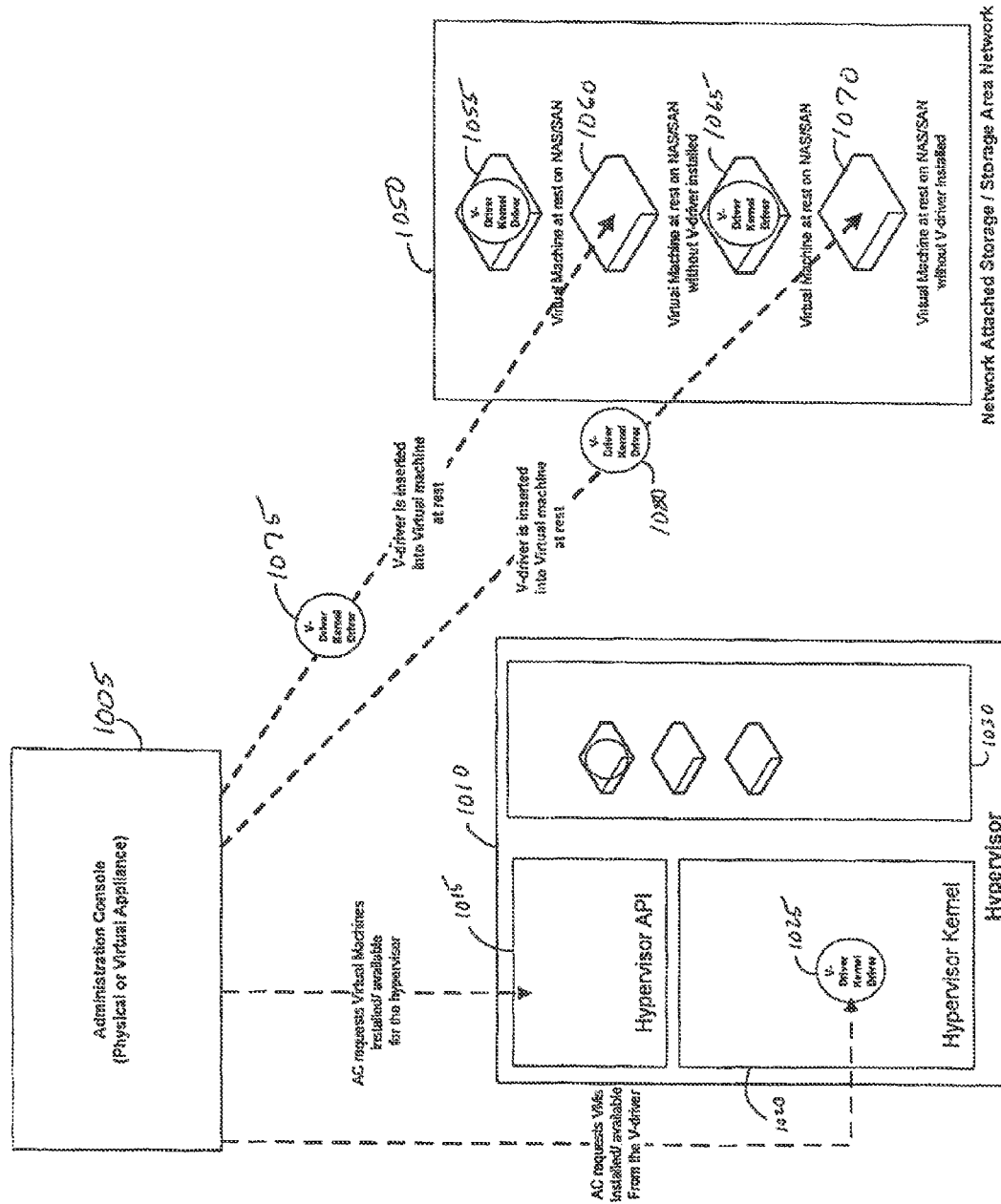
FIG. 10 illustrates an example of a process for direct insertion of a kernel level driver into a virtual machine.

FIG. 10 is a block diagram that depicts several exemplary possible methods for directly inserting a kernel level driver into a virtual machine. As shown in FIG. 10, an administration console 1005 can communicate with a hypervisor 1010, which can contain a hypervisor application programming interface (API) 1015, a hypervisor kernel 1020, and local storage 1030. Administration Console 1005 can also communicate with network storage 1050 (which can comprise general network attached storage devices or a storage area network). Network storage 1050 can further contain various virtual machines 1055, 1060, 1065, and 1070.

Administration console 1005 can identify or qualify which virtual machines in network storage 1050 contain specific software. In an embodiment, a list of virtual machines that do not contain a specific software technology (including, for example, a kernel V-driver according to the present invention) can be developed. Since a hypervisor contains information on the location of each "at rest" virtual machine (i.e., the flat file of a virtual machine that is not being executed), the list of virtual machines that do not contain a kernel V-driver can be used to query hypervisor API 1015 or kernel V-driver 1025 in hypervisor kernel 1020 to locate where physically those virtual machines reside when they are "at rest." It will thus be possible to identify, locate, and insert a kernel level device driver into a virtual machine file that is resident on a physical machine or on a local disk, storage area network, or network attached storage associated with a particular hypervisor.

The insertion of a kernel driver into a flat file that (when executed) is considered a virtual machine may be accomplished by parsing though the "at rest" flat file of the virtual machine and identifying the bit location of other known drivers (e.g., printer drivers, communications drivers, and other similar drivers) Once a specific known driver is location, various methods could be used to insert the kernel driver into the virtual machine flat file.

In an embodiment, virtual machine flat file 1060 can be parsed for known drivers and once located a known driver can be replaced with a kernel driver (such as V-driver Kernel Driver 1075 shown in FIG. 10) that mimics the same functionality as the original driver by compressing both the original driver, the V-driver and a compression engine into the same size memory space as the original uncompressed driver.

In an alternate embodiment, virtual machine flat file 1070 can be parsed for known drivers as described above. The known driver can be replaced with V-driver kernel driver 1080 that will facilitate the functions of the known driver by encapsulating the known driver with an application wrapper that can then utilize V-driver kernel driver 1080 to execute the encapsulated known driver from application space while providing it a kernel interface. The V-driver will assume the location and connection of the "known driver" and move the "known driver" into application space, setting up a conduit to interface the "known driver" back into the kernel.

In yet another embodiment, the virtual machine can be executed in temporary, contained memory (also known as a "sandbox") and the V-driver Kernel Driver can be inserted at run-time, with no user interaction. The insertion is accomplished by utilizing the exposed interfaces at run-time. By loading the Virtual Machine in a separate virtual player instance for the purposes running a driver insertion script against the file, the virtual machine will temporarily be executed by the virtual player instance and then, inserted with the driver and terminated, without user interaction. This process will be performed as a batch process against virtual machines that do not contain the V-driver automatically at the user's option.

The above described methods of inspecting the flat file of a non-executing virtual machine and altering the flat file by inserting a driver provide a limited VM management capability. A VM management method with substantially enhanced capabilities will now be described. The method is operable on various network architectures; exemplary architectures are illustrated in FIG. 11 and FIG. 12.

Figure 11:
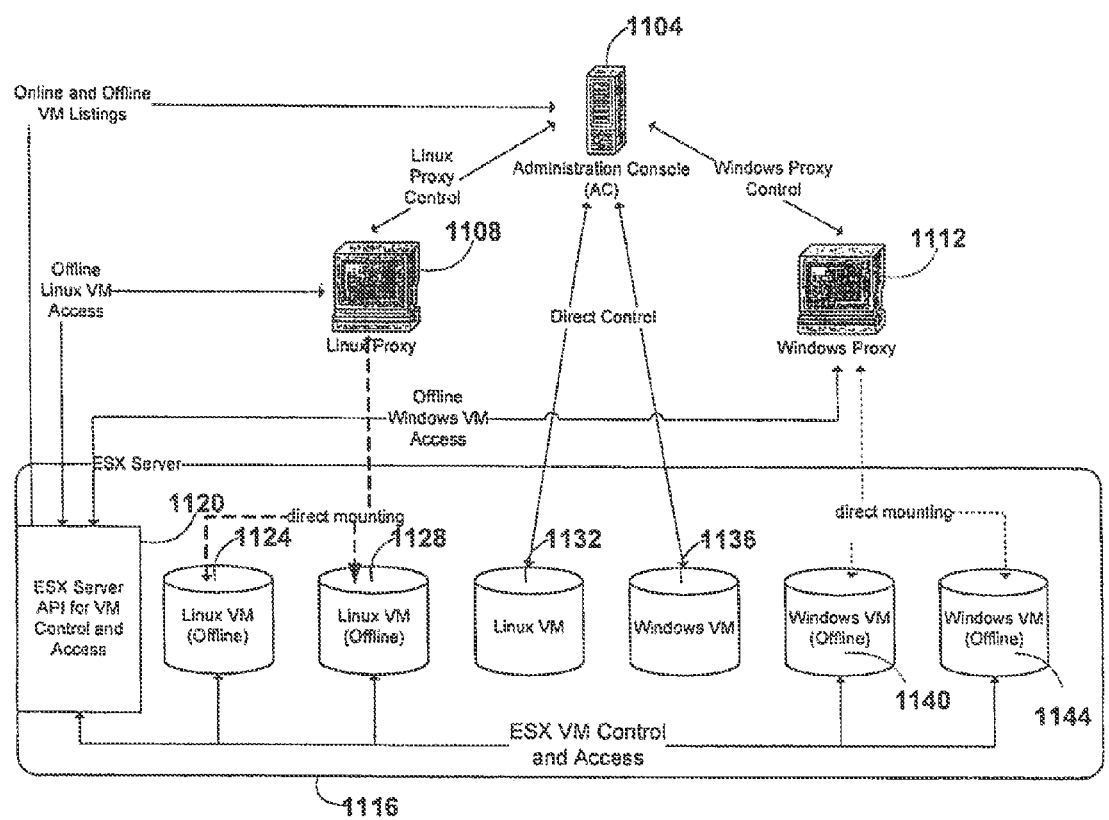
FIG. 11 illustrates an example of a high level architecture usable in an embodiment of the invention for managing virtual machines.
Figure 12:
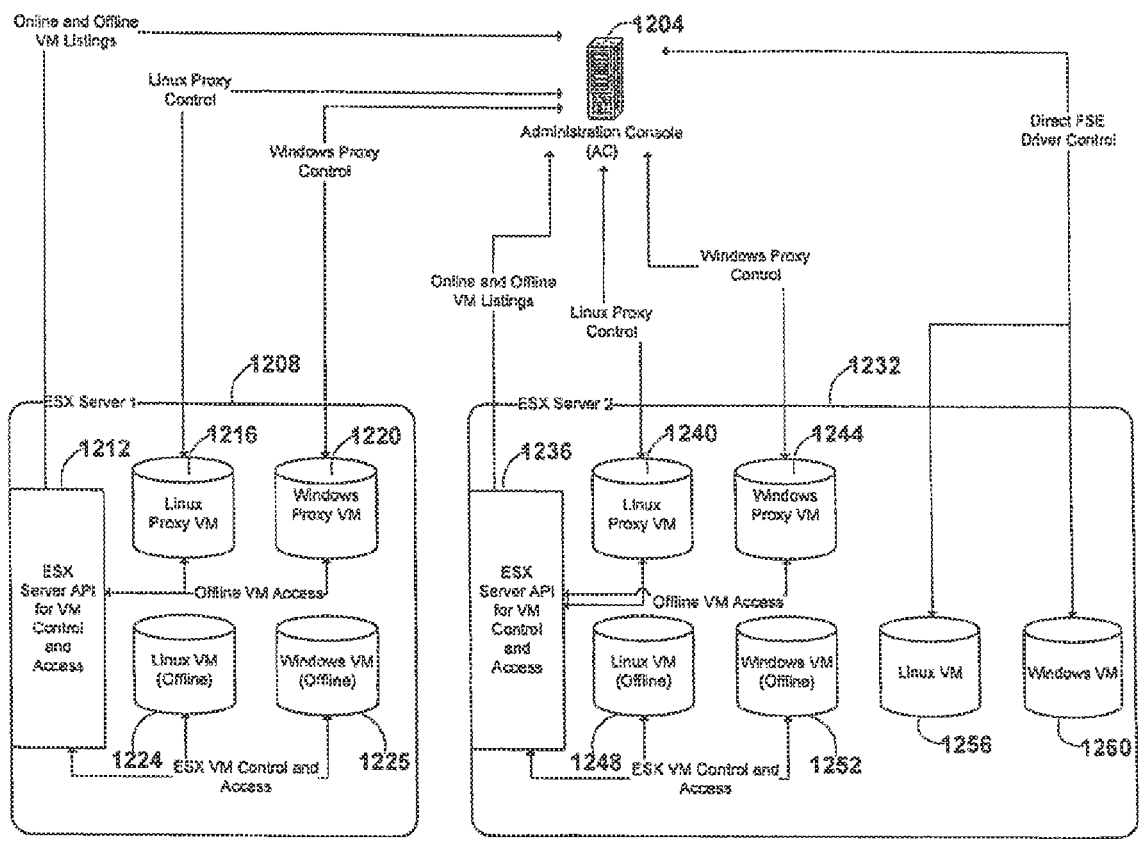
FIG. 12 illustrates an example of a high level architecture usable in another embodiment of the invention for managing virtual machines.

In accordance with an embodiment illustrated in FIG. 11, AC 1104 is communicatively coupled to physical proxy machines. For example, AC 1104 may be communicatively coupled to Linux Proxy 1108 and Windows Proxy 1112. Linux Proxy 1108 and Windows Proxy 1112 are, respectively, capable of interfacing with Linux VM's 1124, 1128 and Windows VM's 1140, 1144. In an embodiment the Linux proxy 1108 can interface with VM 1124 by way of API 1120. In another embodiment, a physical proxy can directly manage a respective VM. For example, Windows proxy 1112 may directly mount a VM 1140. For purposes of illustration FIG. 11 depicts a Linux Proxy 1108 that is separate from Windows Proxy 1112, but a single proxy may be operable to manage both Linux and Windows VM's AC 1104 and the physical proxy machines (e.g., Linux Proxy 1108 and Windows Proxy 1112) can be communicatively coupled to a virtualization server 1116. The virtualization server may be the VMWare ESX Server, for example. Virtualization server 1116 interfaces with the AC 1104 and the physical proxy machines (e.g., Linux Proxy 1108 and Windows Proxy 1112) by way of API 1120. API 1120 can provide control and access interfaces to offline virtual machines, and, in an embodiment, can comprise an ESX Server API as shown in FIG. 11. For example, API 1120 may be communicatively coupled to a number of offline virtual machines within Virtualization server 1116.

As discussed hereinabove, virtual machines may also be contained within network storage 1050, comprising a storage area network or network attached storage devices (SAN/NAS). In such case, a SAN/NAS API (not shown) may be communicatively coupled to physical proxies 1108 and 1112 and to VM's within network storage 1050.

The offline virtual machines may comprise diverse operating systems. For example, as illustrated in FIG. 11, offline virtual machines 1124 and 1128 may run the Linux operating system, whereas offline virtual machines 1140 and 1144 may run the Windows operating system.

The AC 1104 is operable to interface directly with online VM's. For example, as illustrated in FIG. 11, AC 1104 is communicatively coupled to Linux VM 1132 and Windows VM 1136. As described above, offline VM's, (e.g., Linux VM's 1124 and 1128 and Windows VM's 1140 and 1144) may be accessed in three ways:

1. by way of the virtualization API 1120;
2. by way of a SAN/NAS API (not shown)
3. directly by a corresponding physical proxy An embodiment of the present method will now be described with reference to the network architecture illustrated by FIG. 11. In accordance with the present invention, the method begins by AC 1104 establishing an authenticated communications link with one or more proxy machines adapted for communication with an identified VM. For example, if the identified VM is a Linux VM such as VM 1124 and 1128, the AC 1104 will preferably establish an authenticated communications link with Linux proxy 1108; if the identified VM is a Windows VM such as VM 1140 and 1144, the AC 1104 will preferably establish an authenticated communications link with Windows proxy 1112.

As explained in more detail hereinafter, the AC 1104 can then utilize the established, authenticated communications link to perform a management function with respect to the one or more VM's.

In an embodiment, the method of the present invention is operable even when the identified VM is offline. Further, the method of the present invention is operable whether or not the proxy machine (e.g., Linux proxy 1108 or Windows proxy 1112) is a physical machine. For example, the proxy machine may be a virtual proxy machine. If the proxy machine is a virtual proxy machine, it may be executing on a physical machine separate from the virtualization server 1116, or be executing on the virtualization server 1116.

In an embodiment, prior to establishing the authenticated communications link, the AC 1104 may transmit a query to virtualization server 1116. Alternatively, the query may be transmitted to a SAN/NAS API (not shown). The query may be sent to API 1120 of virtualization server 1116 and may request identification of one or more VM's comprising virtualization server 1116.

The management function contemplated by the present invention may include inspecting a file or other data structure within the identified VM. When the management function includes inspecting a file, the file inspected may be any of several types. Examples of file types inspectable under the present method include but are not limited to:

1. disk image file; a virtual disk file that stores the contents of the virtual machine's hard disk drive;
2. wrapper file; a file containing, for example, configuration information, license or BIOS information;
3. log file; a file that provides a record of the VM's activity
4. snapshot file; a file that stores the running state of the VM at a particular moment in time, usually in terms of deltas with respect to a baseline state.

The inspected files may be in a binary or readable format. In the case of binary formatted files, the proxy may first perform a mounting function whereby the binary formatted file is processed in order to make it readable.

Information obtained by inspecting the file may be stored within the AC 1104 and/or the proxy machine (e.g., Linux proxy 1108 or Windows proxy 1112). Preferably, the stored information is provided with an identifier associating the stored information with the identified VM. The identifier is preferably related to information contained at least one of the files inspected. Preferably, the identifier is uniquely or quasi-uniquely associated with information from all of the inspected files. The identifier is advantageously, for example, a hash of a record associated with the VM.

In addition or instead of storing information on the AC 1104 and/or a proxy machine, the method contemplates storing information obtained by inspecting a file of a VM within the VM itself. For example, the information may be advantageously stored within a file directory, a wrapper file or other data structure within the VM.

In an embodiment of the present method, the management function may include functions in addition to inspecting a file of a VM. For example, AC 1104 may be operable to enforce a policy and/or to modify the VM. If the management function relates to modifying the VM, the modification may, for example, be associated with installing administrative data, installing new software, updating an existing software component (for example, via a patch, as is well known), and/or deleting a software component. If the management function relates to enforcing a policy, the enforcement may include, for example, inserting, deleting or deprecating a certificate associated with the policy.

In an embodiment of the present method, AC 1104 may delegate to a proxy machine certain tasks. For example, AC 1104 may provide to proxy machine 1108 or 1112 identification information of a selected VM. For purposes of illustration, if AC 1104 provides to proxy machine 1108 the identification information of selected VM 1124, proxy machine 1108, under the present method, may inspect one or more files within VM 1124. As above, the inspected file may be, for example, a disk image file, a wrapper file, a log file or a snapshot related file.

Information obtained by inspecting the file may be stored within the AC 1104 and/or the proxy machine (in the present example, Linux proxy 1108). Preferably, the stored information is provided with a unique or quasi-unique identifier associating the stored information with (in the present example) VM 1124. Moreover, the unique identifier is advantageously, for example, a hash of a record associated with VM 1124. As used herein, a hash can include a hash result or hash value from a one-way hashing function. A one-way hashing function can be applied to every portion of a data object, thus producing a deterministic value for that data object. In an embodiment, the one-way hashing function can include the Secure Hash Algorithm (SHA-1 or SHA-256).

In addition to or instead of storing information on the AC 1104 and/or proxy machine 1108, the method contemplates storing information obtained by inspecting a file of VM 1124 within VM 1124 itself. For example, the information may be advantageously stored within a file directory or a wrapper file associated with VM 1124.

The management function may include aspects in addition to inspecting a file of VM 1124. For example, AC 1104 may be operable to enforce a policy or to modify VM 1124. If the management function relates to modifying the VM, the modification may, for example, be associated with installing administrative data, installing new software, updating an existing software component, or deleting a software component. If the management function relates to enforcing a policy, the enforcement may include, for example, one or more of the following:

1. Installing or updating a driver
2. Removing prohibited software
3. Installing required software
4. Enforcing "time to live" policies
5. Enforcing location-based policies
6. Inserting, deleting and/or deprecating a certificate associated with the policy.

As used herein, a certificate can include any data object that identifies another data object. A certificate could, for example, include a digital certificate that can contain a public key, along with a number of other fields that contain information about the policy or about the issuer of the certificate. The well understood X.509 standard, ITU recommendation ITU-T X.509, defines a certificate format commonly used for Internet communications.

In an embodiment, the AC 1104 performs a management function with respect to a VM, for example VM 1132, by inspecting a snapshot file created by virtualization server 1116. In this embodiment, VM 1132 is running, i.e., online, at the moment the snapshot is created by virtualization server 1116. The AC 1104 may receive information regarding the snapshot file from virtualization server 1116; the received information can enable the AC 1104 to obtain and inspect the snapshot file. In addition, AC 1104, may perform, or enable an operator to perform, other appropriate actions in response to results of the inspection, including those actions described above. For example, it may modify the snapshot file in order to enforce a policy. As another example, the results of the inspection can be used in taking a further decision with respect to VM 1132, e.g., to turn off VM 1132 or to isolate VM 1132 from other virtual or proxy machines. Thereby, a configuration of the VM 1124 may be managed whether or not a driver has been installed on the VM 1124.

As noted above, the present method is operable whether or not the proxy machine is a physical machine. Moreover, if the proxy machine is a virtual proxy machine, it may be executing on physical machine separate from the virtualization server or be executing on the virtualization server. FIG. 12 illustrates an example of an architecture wherein a proxy machine is a virtual proxy executing on the virtualization server.

In accordance with the embodiment illustrated in FIG. 12, AC 1204 is communicatively coupled to virtual proxy machines. As illustrated, AC 1204 is communicatively coupled to Linux Proxy VM's 1216 and 1240 and to Windows Proxy VM's 1220 and 1244. In this embodiment, virtual Linux proxy VM 1216 and virtual Windows Proxy VM 1220 are executing within virtualization server 1208, and virtual Linux Proxy VM 1240 and virtual Windows Proxy VM 1244 are executing within virtualization server 1232. The virtualization servers may be the VMWare ESX Server, for example.

In the embodiment illustrated in FIG. 12, virtualization servers 1208 and 1232 interface with the AC 1204 by way of API 1212 and 1236, respectively. The APIs 1212 and 1236 can provide control and access interfaces to offline virtual machines associated with respective virtualization servers 1208 and 1232. For example, API 1212 may be communicatively coupled to a number of offline virtual machines within Virtualization server 1208 (e.g., Linux VM 1224 and Windows VM 1225.

The AC 1204 is operable to interface directly with online VM's. For example, as illustrated in FIG. 12, AC 1204 is communicatively coupled to Linux VM 1256 and Windows VM 1260. As described above, offline VM's, (e.g., Linux VM's 1224 and 1248 and Windows VM's 1225 and 1252) may be accessed in three ways:
1. by way of a virtualization API (e.g., API 1212 or 1236);
2. by way of a SAN/NAS API (not shown)
3. directly by a corresponding virtual proxy (e.g., 1216, 1220, 1240 or 1244)

Conclusion

Thus, a method for managing virtual machines within a communications network has been disclosed. The method enables inspection of files associated with a VM even when the VM is offline. Thereby the current configuration of a VM may be known and controlled at substantially any time, whether or not the VM is executing. The method is advantageously employed in the performance of periodic inspections of a network of virtual machines, so as to stop VM configuration drift (e.g., unauthorized modifications, whether deliberate or accidental, to a VM configuration) within the network. Furthermore, software may be inserted into a file directory of an offline VM, for installation and operation upon the next startup of the VM, and software may be deleted from an offline VM. Finally, policy management can be implemented on all VM's within a network, whether or not some VM's are offline. For example, certificates or tags associated with policy management may be inserted, deleted or deprecated.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for virtual machine management, the method comprising:
    an administration console (AC) determining a proxy machine of a plurality of proxy machines for at least one virtual machine (VM), wherein each of the plurality of proxy machines is designated to communicate with a distinct type of a plurality of types of operating systems (OSes) of virtual machines (VMs) hosted by a virtualization server, wherein the AC, the determined proxy machine and the virtualization server operate on different physical machines;
    the AC establishing an authenticated communications link with the determined proxy machine for the at least one VM having an OS of a type corresponding to the determined proxy machine;
    the AC requesting an identification of the at least one VM from the virtualization server;
    the AC transmitting over the authenticated communications link to the determined proxy machine the identification of the at least one VM;
    the AC performing a management function with respect to the at least one VM using the determined proxy machine when the at least one VM is online; and
    the AC performing the management function with respect to the at least one VM using the determined proxy machine when the at least one VM is offline, wherein the management function comprises one or more of monitoring the at least one VM, inspecting the at least one VM, modifying the at least one VM, or enforcing a policy pertaining to the at least one VM.

2. The method of claim 1, wherein the determined proxy machine comprises at least one of a physical proxy machine, or a virtual proxy machine executing on a physical machine separate from the virtualization server.

3. The method of claim 2, wherein the management function comprises inspecting a file within the VM.

4. The method of claim 3, wherein the inspected file is at least one of a disk image file, a wrapper file, a log file, or a snapshot related file.

5. The method of claim 4, wherein information obtained by inspecting the file is stored within at least one of the AC or the determined proxy machine.

6. The method of claim 5, wherein the stored information has an identifier for associating the stored information with the VM.

7. The method of claim 6, wherein the identifier is a hash of a record associated with the VM.

8. The method of claim 4, wherein information obtained by inspecting the file is stored within the VM.

9. The method of claim 1, wherein modifying the VM comprises at least one of installing administrative data, installing new software, updating an existing software component, or deleting a software component.

10. The method of claim 1, wherein enforcing the policy comprises at least one of inserting, deleting or deprecating a certificate associated with the policy.

11. The method of claim 2, wherein
    the determined proxy machine mounts the VM and inspects a file within the VM.

12. The method of claim 11, wherein the inspected file is at least one of a disk image file, a wrapper file, a log file or a snapshot related file.

13. The method of claim 12, wherein information obtained by inspecting the file is stored within at least one of the AC, the VM, or the determined proxy machine.

14. The method of claim 13, wherein the stored information has an identifier for associating the stored information with the VM.

15. The method of claim 14, wherein the identifier is a hash of a record associated with the VM.

16. The method of claim 1, wherein performing the management function comprises:
    the AC receiving from the virtualization server information about a snapshot file of a running VM, said snapshot file being created by the virtualization server; and
    the AC inspecting said snapshot file.

17. A method for virtual machine management, the method comprising:
    an administration console (AC) transmitting a query to a virtualization server, said virtualization server comprising at least one virtual machine (VM) having an operating system (OS) of a first type of a plurality of types of OSes of VMs hosted by the virtualization server;
    the AC receiving, in response to the query, identification of the at least one VM within the virtualization server;
    the AC determining a proxy machine of a plurality of proxy machines for the at least one VM, wherein each of the plurality of proxy machines is designated to communicate with a distinct type of the plurality of types of OSes of VMs hosted by the virtualization server, and establishing an authenticated communications link with the determined proxy machine, said determined proxy machine being designated to communicate with VMs of the first type, wherein the AC, the determined proxy machine and the virtualization server operate on different physical machines;

the AC transmitting over the authenticated communications link to the determined proxy machine the identification of the at least one VM; and the AC performing a management function with respect to the at least one VM using the determined proxy machine, the management function comprising modifying the at least one VM when the at least one VM is online, and modifying the at least one VM when the at least one VM is offline.

18. A system for virtual machine management, the system comprising:

a memory;

a processing device, coupled to the memory; and an administration console (AC), executed by the processing device from the memory, to determine a proxy machine of a plurality of proxy machines for at least one virtual machine (VM), wherein each of the plurality of proxy machines is designated to communicate with a distinct type of a plurality of types of operating systems (OSes) of virtual machines (VMs) hosted by a virtualization server, wherein the AC, the determined proxy machine and the virtualization server operate on different physical machines;

establish an authenticated communications link with the determined proxy machine for at least one VM having an OS of a type corresponding to the determined proxy machine;

request an identification of the at least one VM from the virtualization server;

transmit over the authenticated communications link to the determined proxy machine the identification of the at least one VM;

perform a management function with respect to the at least one VM using the determined proxy machine when the at least one VM is online; and perform the management function with respect to the at least one VM using the determined proxy machine when the at least one VM is offline, wherein the management function comprises one or more of monitoring the at least one VM, inspecting the at least one VM, modifying the at least one VM, or enforcing a policy pertaining to the at least one VM.

19. A non-transitory machine-readable storage medium storing instructions which, when executed, cause a data processing system to perform a method comprising:

an administration console (AC) determining a proxy machine of a plurality of proxy machines for at least one virtual machine (VM), wherein each of the plurality of proxy machines is designated to communicate with a distinct type of a plurality of types of operating systems (OSes) of virtual machines (VMs) hosted by a virtualization server, wherein the AC, the determined proxy machine and the virtualization server operate on different physical machines;

the AC establishing an authenticated communications link with the determined proxy machine for the at least one VM having an OS of a type corresponding to the determined proxy machine;

the AC requesting an identification of the at least one VM from the virtualization server;

the AC transmitting over the authenticated communications link to the determined proxy machine the identification of the at least one VM;

the AC performing a management function with respect to the at least one VM using the determined proxy machine when the at least one VM is online; and the AC performing the management function with respect to the at least one VM using the determined proxy machine when the at least one VM is offline, wherein the management function comprises one or more of monitoring the at least one VM, inspecting the at least one VM, modifying the at least one VM, or enforcing a policy pertaining to the at least one VM.

* * * * *